(12) United States Patent
Otsuki

(10) Patent No.: US 7,494,204 B2
(45) Date of Patent: Feb. 24, 2009

(54) CORRECTION OF PAPER FEED ERROR DURING INTERLACE PRINTING USING A REPRESENTATIVE CORRECTION VALUE

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 765 days.

(21) Appl. No.: 10/186,394

(22) Filed: Jul. 1, 2002

(65) Prior Publication Data

US 2003/0025922 A1 Feb. 6, 2003

(30) Foreign Application Priority Data

Jul. 2, 2001 (JP) ............... 2001-200755

(51) Int. Cl.
*B41J 29/38* (2006.01)
(52) U.S. Cl. ............................. 347/16; 347/9
(58) Field of Classification Search .............. 347/16, 347/41, 19
See application file for complete search history.

(56) References Cited

U.S. PATENT DOCUMENTS

| 4,198,642 A | 4/1980 | Gamblin |
| 6,116,795 A * | 9/2000 | Ogasawara ............... 400/582 |
| 6,126,345 A * | 10/2000 | Ito et al. ................. 400/624 |
| 6,137,592 A | 10/2000 | Arquilevich et al. |
| 6,353,481 B1 * | 3/2002 | Lee ........................ 358/1.14 |
| 6,439,684 B1 * | 8/2002 | Yoshimura et al. ......... 347/19 |
| 6,454,474 B1 * | 9/2002 | Lesniak et al. ........... 400/582 |
| 6,464,335 B2 * | 10/2002 | Suzuki ..................... 347/43 |
| 6,530,635 B2 * | 3/2003 | Otsuki ....................... 347/9 |
| 6,769,759 B2 * | 8/2004 | Yamasaki et al. .......... 347/41 |
| 6,784,908 B2 * | 8/2004 | Shibuya ................... 347/192 |

FOREIGN PATENT DOCUMENTS

| JP | 06-127032 A | 5/1994 |
| JP | 07-203207 A | 8/1995 |
| JP | 07-242025 A | 9/1995 |
| JP | 8-85242 | 4/1996 |
| JP | 11-254776 | 9/1999 |
| JP | 2000-153660 | 6/2000 |

* cited by examiner

*Primary Examiner*—Luu Matthew
*Assistant Examiner*—Shelby Fidler
(74) *Attorney, Agent, or Firm*—Sughrue Mion, PLLC

(57) ABSTRACT

A technique for improving image quality by correcting a paper feed error in a printer is provided. First, a test pattern is printed using one representative feed amount that is to be used in printing. A correction value for paper feed is determined by the printing result of this test pattern. Correction values for the other feed amounts are predicted from the correction value for the representative feed amount.

21 Claims, 19 Drawing Sheets

PATCH No. = 1
(Correction value δ = 0)    ← WHITE STREAK

PATCH No. = 2
(Correction value δ = 1)

PATCH No. = 3
(Correction value = 2)    ← BLACK STREAK

PAPER FEED EXAMPLE 1 (composite black printing)

Fig. 12(A)

PAPER FEED EXAMPLE 1 (quasi-band feed)

|  | F1-F3 | F4 | ΣFi | Number of used nozzles N per color | N × k |
|---|---|---|---|---|---|
| Color mode | 1 | 237 | 240 | 60 | 240 |
| Monochromatic mode | 1 | 717 | 720 | 180 | 720 |

Fig. 12(B)

PAPER FEED EXAMPLE 2

|  | F1-F3 | F4 | ΣFi | Number of used nozzles N per color | N × k |
|---|---|---|---|---|---|
| Color mode | 59 | 59 | 236 | 59 | 236 |
| Monochromatic mode | 179 | 179 | 716 | 179 | 716 |

RELATIONSHIP BETWEEN FEED AMOUNT AND CORRECTION VALUE

UNITS OF CORRECTION VALUE $\delta$

Fig.14

|  | Paper feed correction value $\delta$ (pulses) | | | |
| --- | --- | --- | --- | --- |
|  | F=59 | F=179 | F=237 | F=717 |
| Ordinary paper | 3 | 8 | 10 | 22 |
| Glossy film | 3 | 8 | 10 | 22 |
| Photographic paper | 4 | 11 | 14 | 31 |
| Roll type photographic paper | 5 | 14 | 18 | 39 |

RELATIONSHIP BETWEEN PAPER FEED VELOCITY AND CORRECTION VALUE

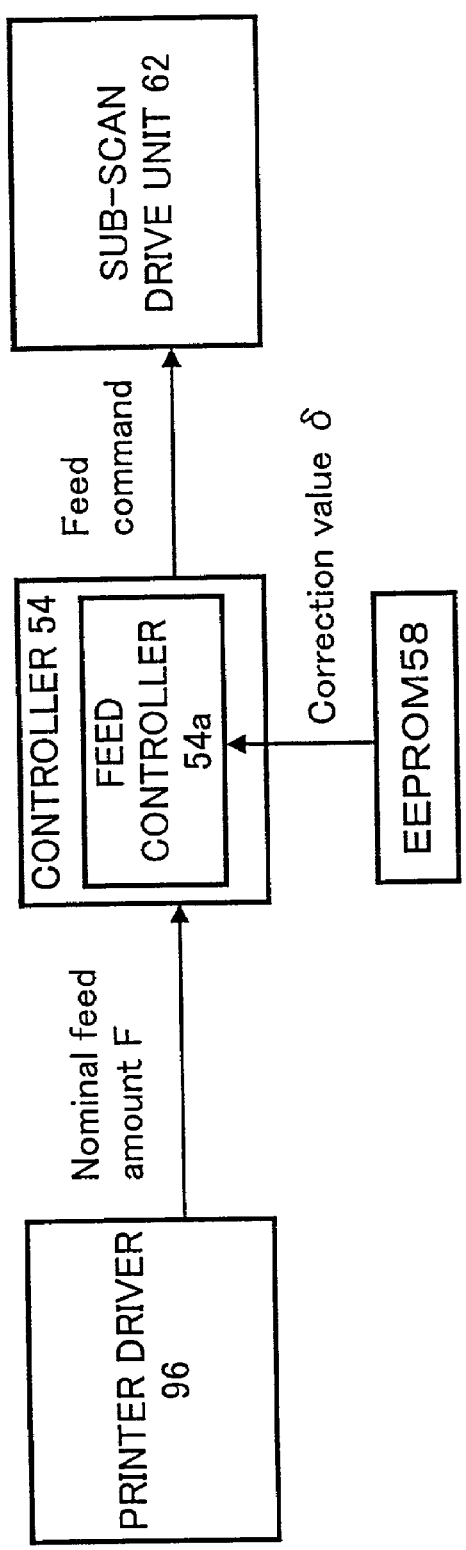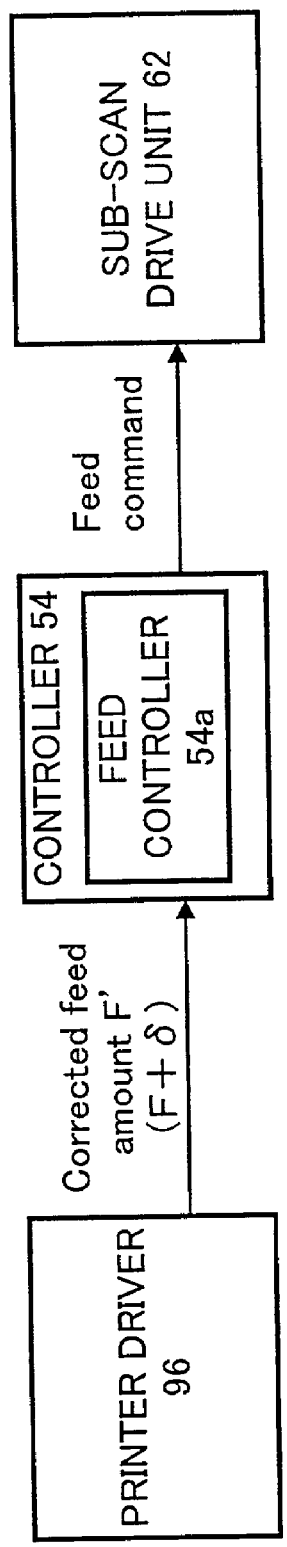
Fig. 16(A)
PAPER FEED CORRECTION VALUE TRANSMISSION METHOD 1
Fig. 16(B)
PAPER FEED CORRECTION VALUE TRANSMISSION METHOD 2

PRINT SIGNAL FOR PATCH No. 2

PRINT SIGNAL FOR PATCH No. 1

Fig. 19(A)
EXAMPLE 1 OF TEST PATTERN PRINT SIGNALS

| | Paper feed amount | Raster data |
|---|---|---|
| Print signal for patch No. 1 | F1=F2=F3=1, F4=237 | Raster data RD1 |
| Print signal for patch No. 2 | F1=F2=F3=1, F4=237 | Raster data RD2 |
| Print signal for patch No. 3 | F1=F2=F3=1, F4=237 | Raster data RD3 |

(Paper feed amounts are maintained the same while raster data are set different.)

Fig. 19(B)
EXAMPLE 2 OF TEST PATTERN PRINT SIGNALS

| | Paper feed amount | Raster data |
|---|---|---|
| Print signal for patch No. 1 | F1=F2=F3=1, F4=238 | Raster data RD1 |
| Print signal for patch No. 2 | F1=F2=F3=1, F4=237 | Raster data RD2 |
| Print signal for patch No. 3 | F1=F2=F3=1, F4=236 | Raster data RD3 |

(Raster data are maintained the same while paper feed mounts are set different.)

CORRECTION OF PAPER FEED ERROR DURING INTERLACE PRINTING USING A REPRESENTATIVE CORRECTION VALUE

BACKGROUND OF THE INVENTION

1. Field of the Invention

The present invention relates to a technique for performing printing by recording ink dots on a recording medium while a print head is moving in the main scan direction.

2. Description of the Related Art

Ink jet printers which eject ink from a head and laser printers have become popular as output devices for computers. Especially in recent years, color printers using color inks have also been widely utilized.

Various types of printing media for ink jet printers have been commercially marketed. Since the coloring properties of inks differ in different printing media, there are considerable differences in the images obtained. The type of printing medium used also affects the precision of the sub-scan feed of the printing medium (hereafter referred to as the "paper feed"). For example, the actual feed amount may vary considerably between printing media with easy-slip surfaces and printing media with surfaces that do not slip easily, even if the same feed operation is performed. Furthermore, the precision of the paper feed tends to vary considerably from printer to printer.

The degree of precision of the paper feed has a great effect on the image quality. However, in the case of printers that perform printing using a so-called interlace recording mode, the image quality degradation caused by paper feed error can be suppressed to some extent by appropriately setting the paper feed amount. Here, the term "interlace recording mode" refers to a printing method that is performed using a print head that has nozzles aligned in a row at a nozzle pitch that is twice the dot pitch in the sub-scan direction (i. e., the main scan line pitch) or greater. In cases where such a print head is used, gaps are generated between the main scan lines (raster lines) that are recorded by a single main scan pass. Furthermore, a number of main scan passes that is equal to the number of main scan lines contained in these gaps is further required in order to eliminate the gaps. It is known that various feed amounts can be used in the case of such an interlace recording mode. Conventionally, therefore, the effect of variation in the paper feed precision on the mage quality has be minimized by appropriately selecting the paper feed amount in the interlace recording mode.

For the reasons described above, the direct correction of paper feed error in printers using an interlace recording mode has not been seriously considered. However, as high image quality in printers has spread in recent years, there has been a demand for further improvement of image quality by the appropriate correction of paper feed error in printers that perform printing in an interlace recording mode. This demand has been increased not only against interlace recording mode printers but also against non-interlace recording mode printers.

SUMMARY OF THE INVENTION

An object of the present invention is to provide a technique for improving image quality by correcting the paper feed error in a printer.

In order to attain the above object, a method according to the present invention is a method of correcting a sub-scan feed amount of a printing medium in a printing device which performs printing by recording ink dots on the printing medium while moving a print head in a main scan direction, comprising the steps of (a) setting plural feed amounts of sub-scan of a printing medium that are to be used in actual printing; (b) printing a test pattern including a plurality of color patches printed with different correction values, respectively, for at least one representative feed amount among the plural feed amounts, the test pattern being used to determine a correction value for the representative feed amount; (c) using the correction value for the representative feed amount determined from a print of the test pattern in order to predict correction values for the other feed amounts; and (d) correcting sub-scan feed amounts during printing on the basis of the correction value for the representative feed amount and the predicted correction values for the other feed amounts.

According to this method, since a test pattern is printed so as to include a plurality of color patches printed with different correction values, and since sub-scan feed amounts during printing are corrected on the basis of the correction values determined from the printing result of the test pattern, image quality is improved through correction of the paper feed error in a printer. Moreover, since the test pattern is printed only for the representative feed amount among the plural feed amounts to be used in printing, the work necessary for the correction can be completed with smaller labor.

The print head may include a plurality of nozzles arranged at a nozzle pitch of k times (k is an integer of 2 or greater) a dot pitch in a sub-scan direction that is substantially perpendicular to the main scan direction. In this case, the plural feed amounts are used in printing in an interlace recording mode, and the printing of the test pattern in the step (b) is preferably performed in the interlace recording mode.

In this arrangement, the sub-scan feed errors can be properly corrected in a printer for performing printing in a interlace recording mode.

The correction values for the other feed amounts may be predicted from the correction value for the representative feed amount according to a predetermined prediction curve.

In this arrangement, the other correction values can be easily predicted.

The representative feed amount preferably includes a maximum value among the plural feed amounts.

Generally, the feed error increases as the feed amount, and so does the correction value. Accordingly, the use of the maximum feed amount as the representative feed amount can improve precision of the determination of the desired correction values.

The step (c) may include a step of storing the correction values for the plural feed amounts in a non-volatile memory in the printing device.

This arrangement secures printing with appropriate correction value.

The step (c) preferably includes a step of determining the correction values for the plural feed amounts with respect to each of a plurality of printing media that are planned to be used in the printing device.

The feed error tends to depend on the types of printing media, and therefore the determination of correction values with respect to each of a plurality of printing media will improve the correction precision.

The step (c) may further include steps of: determining correction values for the plural feed mounts using the test pattern with respect to a selected one of a plurality of printing media; and predicting correction values for the plural feed mounts with respect to the other printing media from the correction values for the plural feed mounts respect to the selected one of a plurality of printing media.

This arrangement will further reduce the necessary work to complete the correction.

The step (c) may include a step of determining the correction values with respect to each of sub-scan velocities that are planned to be used in the printing device.

Since the feed error also depends on the sub-scan velocity, the determination of correction values with respect to each sub-scan velocity will improve the correction precision.

The step (b) may includes the steps of: (i) selecting N nozzles-to-be-used (N is an integer of 2 or greater) among a plurality of nozzles for each color; (ii) performing (k−1) scan sets each consisting of one main scan and one sub-scan feed by a first feed amount that is equal to a dot pitch in a sub-scan direction, and performing one main scan and a sub-scan feed by a second feed amount that is equal to $\{N \times k - (k-1)\}$ time the dot pitch; and (iii) repeatedly performing step (ii) to print the test pattern.

The test pattern printed in this way easily causes a streak of image deterioration, called "banding", running along the main scan direction due to the sub-scan feed error. Accordingly, the determination of correction values using this test pattern ilcorrect the sub-scan feed error so as not to cause the banding.

The present invention can be implemented in a variety of ways, examples of which include: a method and apparatus for correcting a sub-scan feed amount (paper feed amount), a sub-scan controlling method and apparatus therefor, a printing method and a printing device with the correction of the sub-scan feed, a method and apparatus for controlling a printing device with the correction of the sub-scan feed, a computer program for implementing the methods and the apparatuses, a computer program product having a computer readable medium storing the computer program; and a data signal embodied in a carrier wave containing the computer program.

These and other objects, features, aspects, and advantages of the present invention will become more apparent from the following detailed description of the preferred embodiments with the accompanying drawings.

BRIEF DESCRIPTION OF THE DRAWINGS

FIGS. 12(A) and 12(B) show examples of the paper feed amounts used in actual printing using the print head 36 shown in FIG. 5.

FIG. 14 is an explanatory diagram which shows paper feed correction values determined for different types of printing paper.

FIGS. 16(A) and 16(B) are explanatory diagrams which show two methods for transmitting the paper feed amount F and corresponding correction value δ.

FIGS. 19(A) and 19(B) are explanatory diagrams which show examples of structure of test pattern print signals.

DESCRIPTION OF THE PREFERRED EMBODIMENT

Figure 1:
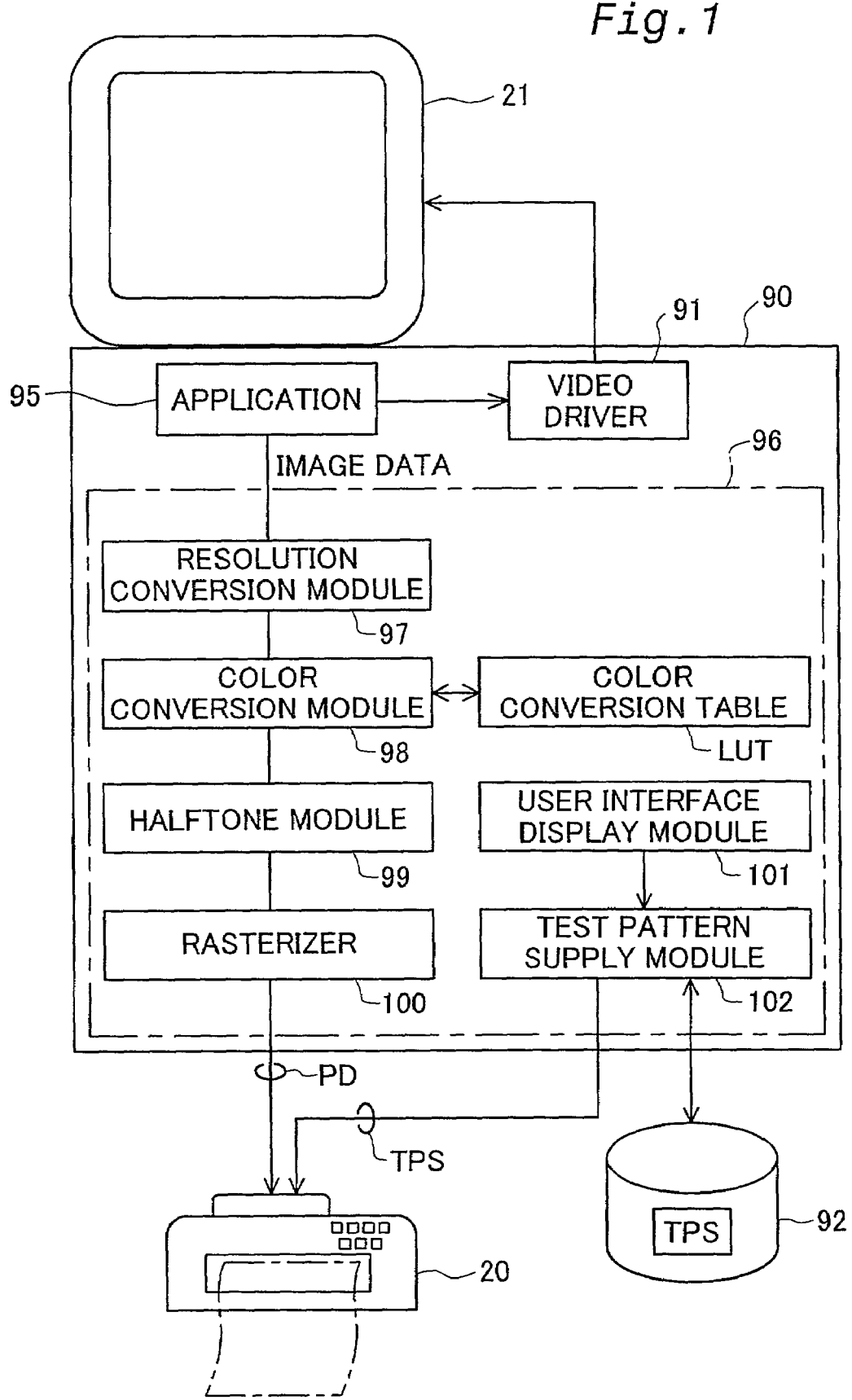
FIG. 1 is a block diagram which shows the structure of a printing system as one embodiment of the present invention.

Embodiments of the present invention will be described in the following order on the basis of working examples.
A. Overall structure of the apparatus
B. Outline procedure of paper feed correction
C. Details of test pattern printing method and method used to determine paper feed correction value
D. Structure of test pattern print signal
E. Modifications A. Overall Structure of the Apparatus:

FIG. 1 is a block diagram which illustrates the structure of a printing system as one embodiment of the present invention. This printing system comprises a computer 90 and a color ink jet printer 20. The printing system including the printer 20 and computer 90 may be called a "printing apparatus" in a broad sense.

In the computer 90, an application program 95 is operated under the control of a specific operating system. A video driver 91 and a printer driver 96 are incorporated into the operating system, and printing data PD is output from the application program 95 to the printer 20 via these drivers. The application program 95 which performs image retouching and the like performs desired processing on the image that is the object of processing, and displays the image on a CRT 21 via the video driver 91.

When the application program 95 issues a print command, the printer driver 96 of the computer 90 receives the image data from the application program 95, and converts this data into printing data PD that is provided to the printer 20. The printer driver 96 includes a resolution conversion module 97, color conversion module 98, halftone module 99, rasterizer 100, user interface display module 101, test pattern supply module 102 and color conversion look-up table LUT.

The resolution conversion module 97 has the function of converting the resolution of the color image data formed by the application program 95 into the printing resolution. The image data thus subjected to resolution conversion is image information that still consists of the three color components RGB. The color conversion module 98 converts the RGB image data into multi-level data of a plurality of ink colors that can be utilized by the printer 20 for each pixel while referring to the color conversion look-up table LUT.

The multi-level data after the color conversion has, for example, 256 gradation values. The halftone module 99 performs so-called halftone processing, and thus produces halftone image data. This halftone image data is rearranged in the data order that is to be transmitted to the printer 20 by the rasterizer 100, and is output as the final printing data PD. The printing data PD includes raster data that represents dot formation states during each main scan, and another data that indicates sub-scan feed amounts.

The user interface display module 101 has the function of displaying various user interface windows relating to printing, and the function of receiving user input in these windows.

The test pattern supply module 102 has the function of reading out from the hard disk 92 the test pattern print signal TPS that is used to determine a correction value for the sub-scan feed amount (also called the "paper feed amount"), and providing this signal to the printer 20. In cases where the test pattern print signal TPS is stored as compressed data, the test pattern supply module 102 has the function of expanding this compressed data.

The printer driver 96 corresponds to a program implementing the function of supplying printing data PD and test pattern print signals TPS to the printer 20. The program implementing the function of the printer driver 96 is provided in a form of a computer-readable recording medium storing the program. Various types of computer-readable recording media such as flexible disks, CD-ROMs, optical-magnetic disks, IC cards, ROM cartridges, punch cards, printed matter on which a code such as a bar code is printed, and computer internal memory devices (memories such as RAM, ROM) or external memory devices may be utilized as such a recording medium. Furthermore, such a computer program may also be downloaded into the computer 90 via the internet.

The computer 90 equipped with this printer driver 96 functions as a printing control device that causes printing to be performed by supplying printing data PD and test pattern print signals TPS to the printer 20.

Figure 2:
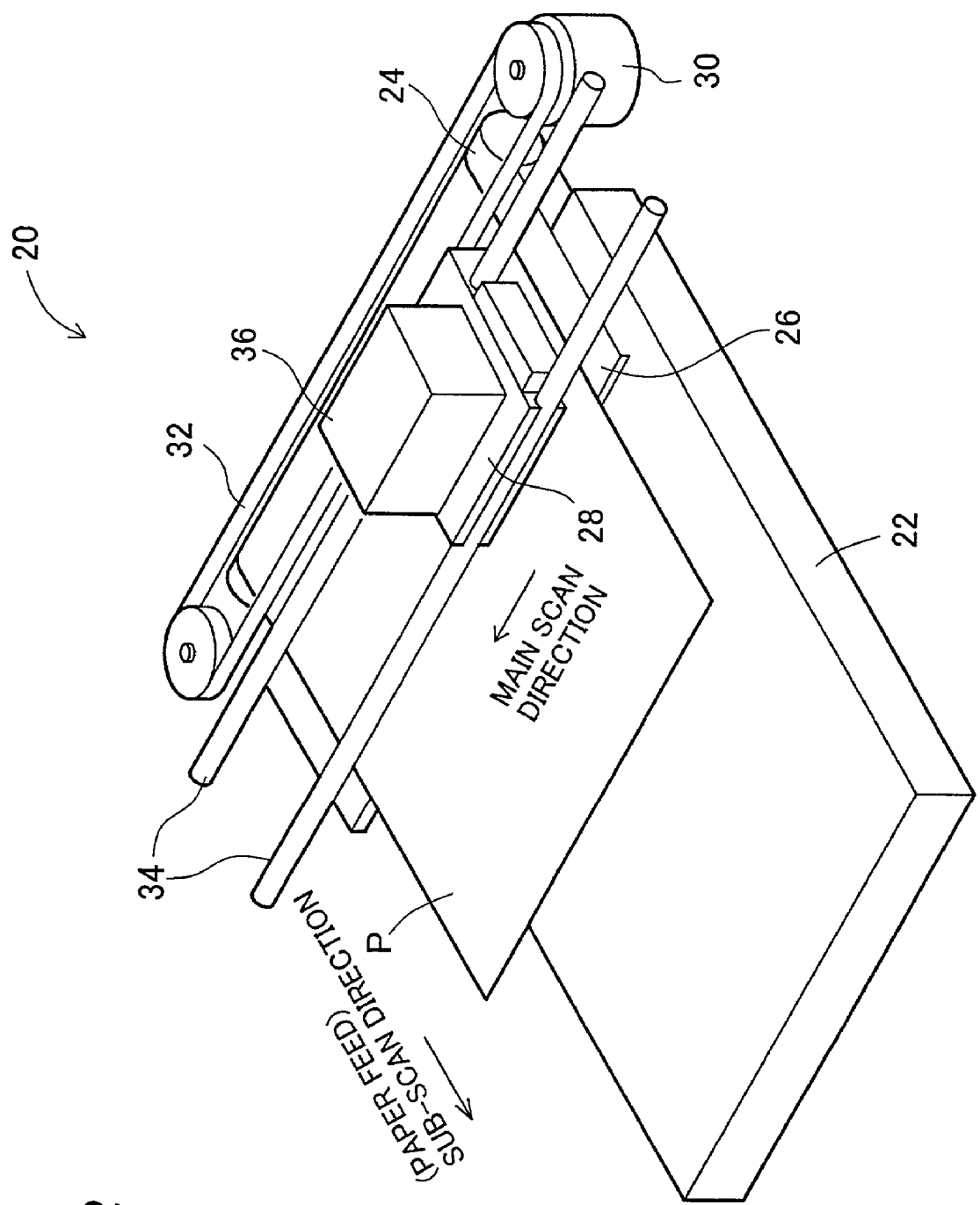
FIG. 2 is a schematic perspective view showing the main structure of a color ink jet printer 20.

FIG. 2 is a schematic perspective view which shows the main structure of a color ink jet printer 20. This printer 20 comprises a paper stacker 22, a paper fee roller 24 driven by a step motor (not shown in the figures), a platen 26, a carriage 28, a carriage motor 30, a tractor belt 32 driven by the carriage motor 30, and guide rails 34 for the carriage 28. A print head 36 equipped with numerous nozzles is mounted on the carriage 28.

The printing paper P is retrieved from the paper stacker 22 by the paper feed roller 24 and fed over the surface of the platen 26 in the sub-scan direction. The carriage 28 is pulled by the tractor belt 32 driven by the carriage motor 30 so that this carriage 28 moves in the main scan direction along the guide rails 34. The main scan direction is perpendicular to the sub-scan direction.

Figure 3:
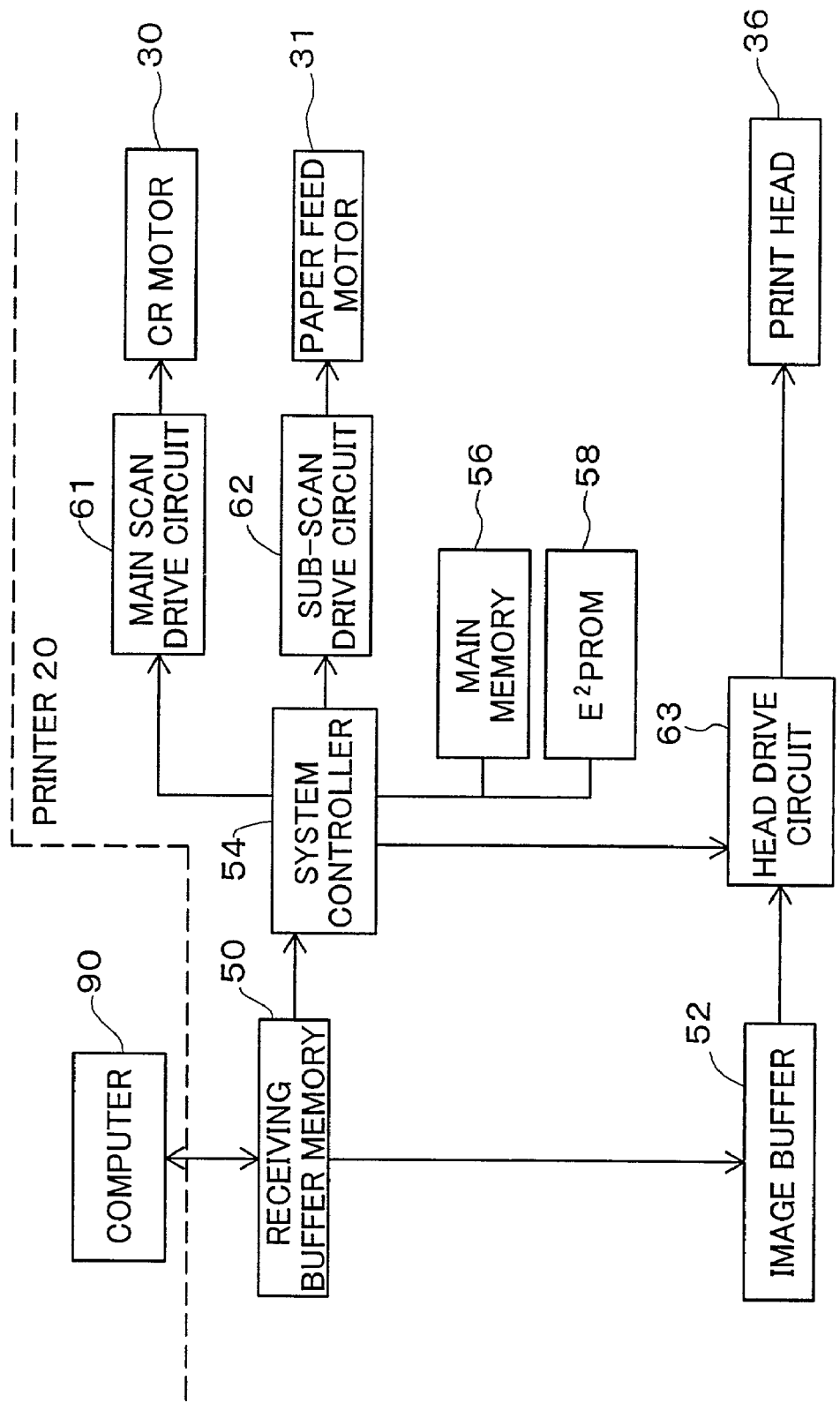
FIG. 3 is a block diagram which shows the electrical structure of the printer 20.

FIG. 3 is a block diagram which shows the electrical structure of the ink jet printer 20. This printer 20 comprises a receiving buffer memory 50 that receives signals provided from the computer 90, an image buffer 52 that stores printing data, a system controller 54 that control the operation of the printer 20 as a whole, a main memory 56, and an EEPROM 58. A main scan drive circuit 61 that drives the carriage motor 30, a sub-scan drive circuit 62 that drives the paper feed motor 31, and a head drive circuit 63 that drives the print head 36, are further connected to the system controller 54.

The main scan drive circuit 61, carriage motor 30, tractor belt 32 (FIG. 2) and guide rails 34 constitute a main scan drive mechanism. The sub-scan drive circuit 62, paper feed motor 31 and paper feed roller 24 (FIG. 2) constitute a sub-scan drive mechanism (also called a "feed mechanism").

The printing data that is transmitted from the computer 90 is temporarily stored in the receiving buffer memory 50. Inside the printer 20, the system controller 54 reads out the necessary information among the printing data from the receiving buffer memory 50, and sends control signals to the respective drive circuits 61, 62 and 63 on the basis of this information.

Printing data with a plurality of color components received by the receiving buffer memory 50 is stored in the image buffer 52. The head drive circuit 63 reads out the printing data of the respective color components from the image buffer 52 in accordance with the control signals from the system controller 54, and drives the nozzle array of respective colors installed in the print head 36 in accordance with this printing data.

Figure 4:
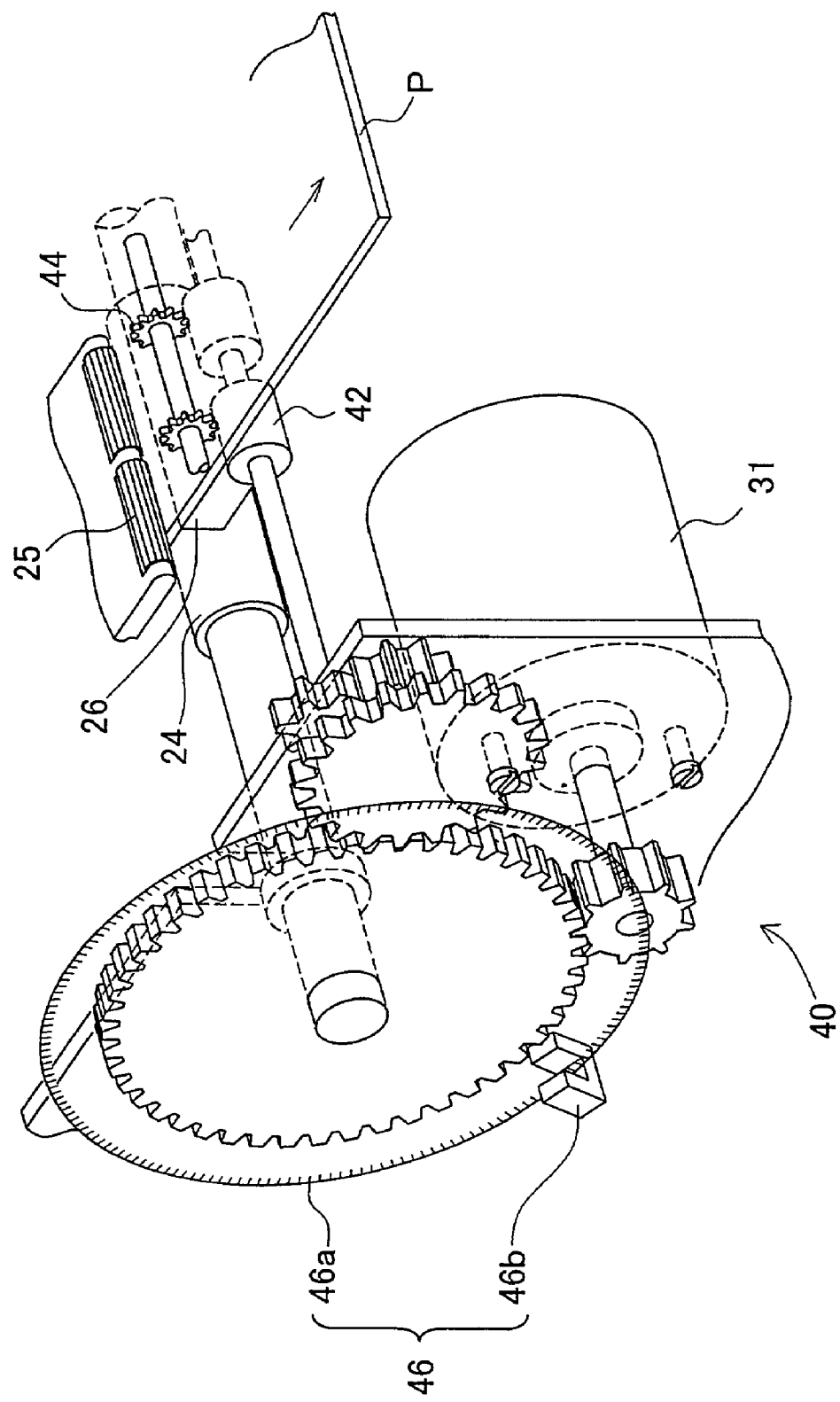
FIG. 4 is a perspective view which shows the structure of the sub-scan drive mechanism.

FIG. 4 is a perspective view which shows the structure of the sub-scan drive mechanism. The motive force of the paper feed motor 31 is transmitted to the paper feed roller 24 and paper ejection roller 42 via a gear train 40. A driven roller 25 is disposed against the paper feed roller 24, and a jag roller 44 is disposed as a driven roller against the paper ejection roller 42. The printing paper P is fed while being clamped by these rollers, and moves over the platen 26.

A rotary encoder 46 constructed from a scale disk 46a and a photo-sensor 46b is disposed on the shaft of the paper feed roller 24. The paper feed amount (sub-scan feed amount) is determined in accordance with pulse signals from this rotary encoder 46.

Figure 5:
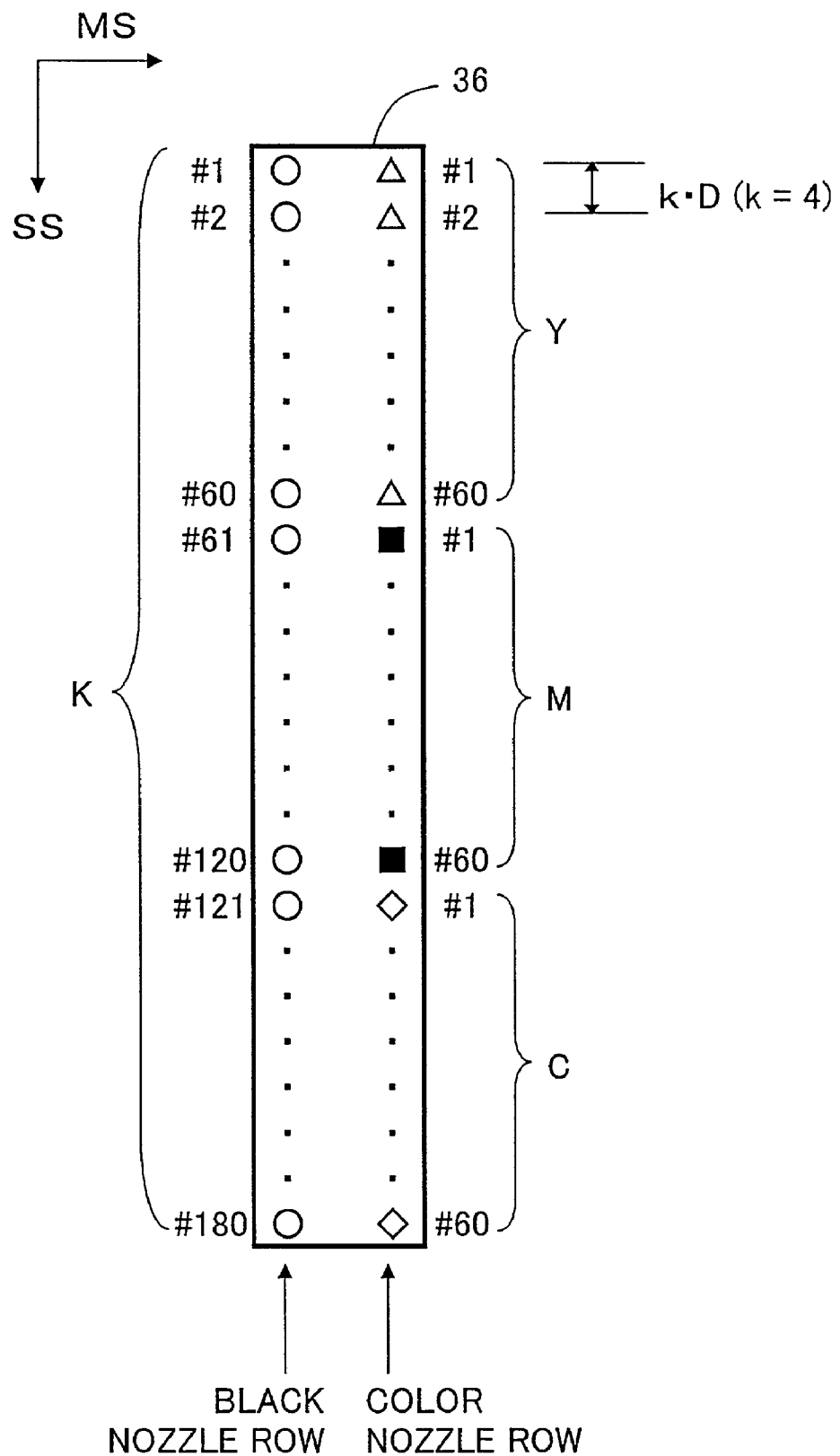
FIG. 5 is an explanatory diagram showing the nozzle arrangement on the undersurface of the print head 36.

FIG. 5 is an explanatory diagram which shows the nozzle arrangement on the undersurface of the print head 36. The print head 36 has a black nozzle row and a color nozzle row that are respectively arranged in single straight lines along the sub-scan direction SS. In the present specification, the "nozzle rows" will also be called "nozzle groups".

The black nozzle row (indicated by white circles) has 180 nozzles #1 through #180. These nozzles #1 through #180 are aligned at a fixed nozzle pitch k×D along the sub-scan direction. Here, D is a dot pitch in the sub-scan direction SS, and k is an integer. The dot pitch D in the sub-scan direction is also equal to the pitch of the main scan lines (raster lines). The integer k that expresses the nozzle pitch k×D will hereafter be referred to simply as the "nozzle pitch k". The units of the nozzle pitch k are "dots"; this refers to the dot pitch in the sub-scan direction.

In the example shown in FIG. 5, the nozzle pitch k is 4 dots. However, the nozzle pitch k can be set at any desired integer equal to or greater than 2.

The color nozzle row includes a yellow nozzle group Y (indicated by white triangles), a magenta nozzle group M (indicated by black squares) and a cyan nozzle group C (indicated by white diamonds). In this specification, the nozzle groups used for colored inks are also referred to as "colored nozzle groups". Each colored nozzle group has 60 nozzles #1 through #60. The nozzle pitch of the colored nozzle groups is the same as the nozzle pitch k of the black nozzle row. The nozzles of the colored nozzle groups are disposed in the same sub-scan positions as the nozzles of the black nozzle row.

During printing, ink droplets are ejected from the respective nozzles while the print head 36 is moving at a constant speed in the main scan direction together with the carriage 28 (FIG. 2). However, depending on the printing system, all of the nozzles are not always used; in some cases, only some of the nozzles are used.

In the case of black and white printing, almost all of the 180 black nozzles are used. On the other hand, in the case of color printing, the 60 nozzles for each of the colors CMY are used, and 60 black nozzles are also used. For example, the 60 black nozzles that are used in color printing are the nozzles #121 through #180 disposed in the same sub-scan positions as the 60 cyan nozzles.

B. Outline Procedure of Paper Feed Correction:

As will be described below, the paper feed error can be corrected prior to the shipping of the printer 20, and also can be corrected by the user after shipping.

Figure 6:
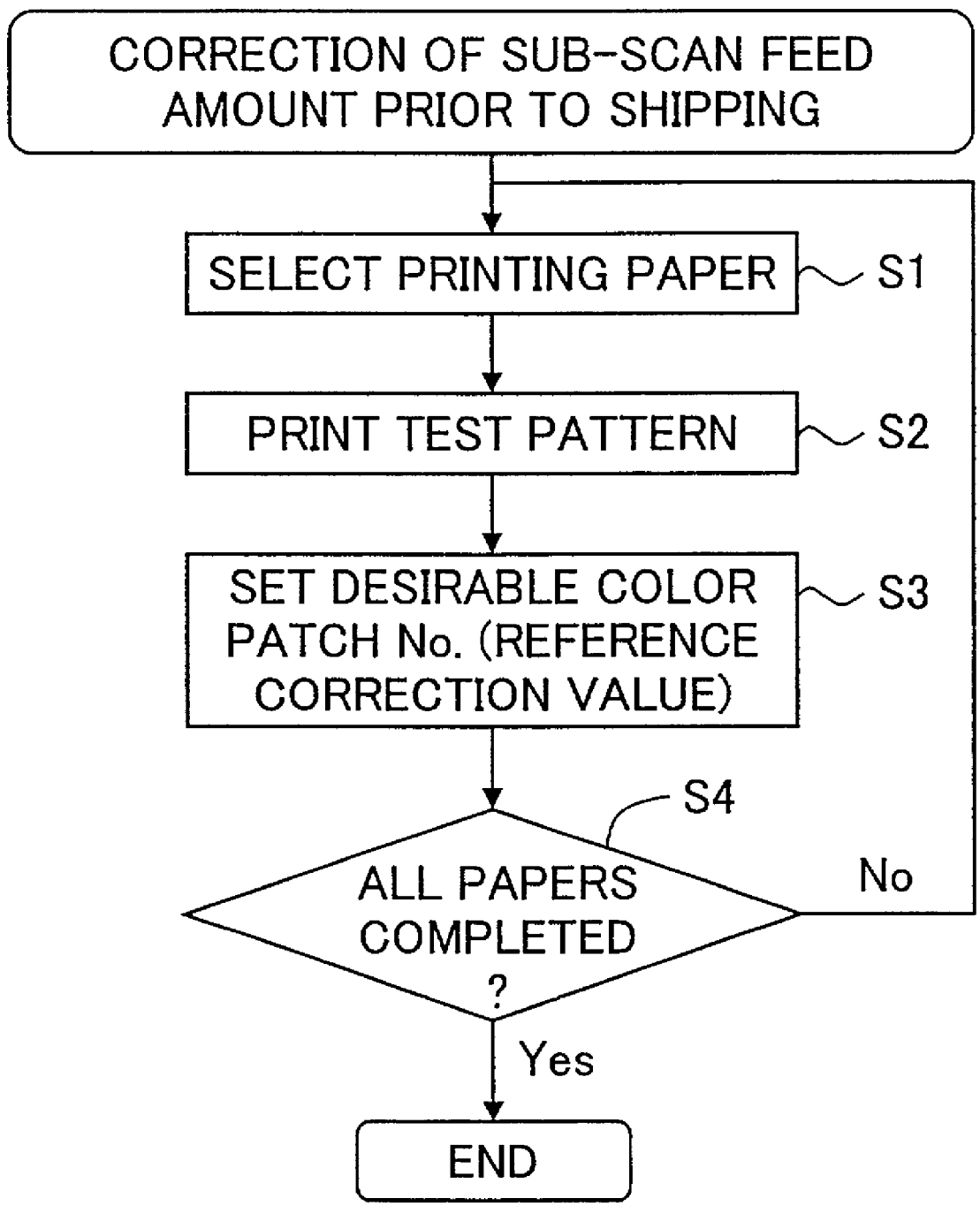
FIG. 6 is a flow chart which shows the procedure used to correct the paper feed prior to the shipping of the printer.

FIG. 6 is a flow chart which shows the procedure used to correct the paper feed prior to the shipping of the printer 20. In step S1, the types of printing paper (printing media) planned to be used in the printer 20 are successively selected. Types of printing paper that may be used include (for example) ordinary paper, glossy films, photographic paper, roll type photographic paper. In step S2, the selected printing paper is set in the printer 20, and a specific test pattern is printed.

Figure 7:
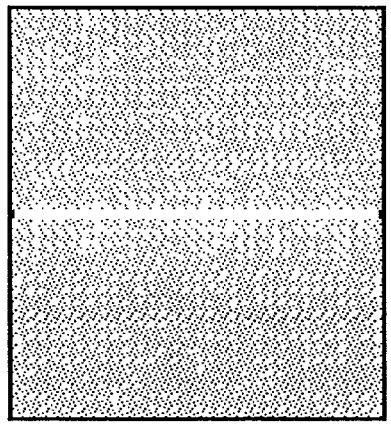
FIG. 7 shows an example of test patterns.
Figure 7:
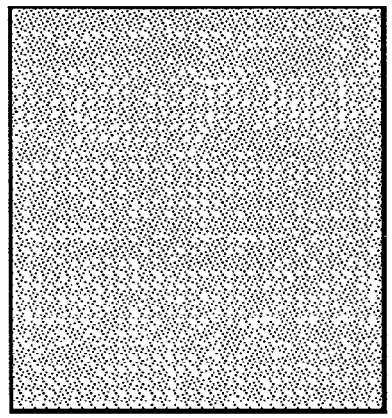
Figure 7:
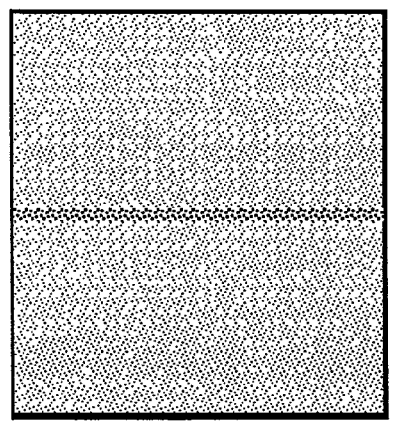

FIG. 7 shows an example of a test pattern. In this example, the test pattern includes three color patches with different paper feed correction values δ. The patch number printed beside each color patch is associated beforehand with the paper feed correction value δ. However, the paper feed corrections values δ are merely depicted for convenience in the figure; these values are not actually printed. Each color patch is a gray patch in which a gray region of uniform optical density is reproduced by composite black using CMY inks. Such gray patches reflect both paper feed error and position error of the dots of the respective colors. Since the image quality of the actual printed matter is affected not only by the paper feed error, but also by the position error of the dots of the respective colors, it is desirable from the standpoint of improving the image quality to use gray patches that are reproduced by composite black as a test pattern. However, various other types of patterns can be used as test patterns; for example, other types of color patches and ruled line patters may also be used instead. In the present specification, the term "color patch" refers to an image region that is reproduced with an approximately uniform color. Details of the test pattern printing method will be described later.

Furthermore, in the present specification, the term "composite black" refers to a gray color that is reproduced using inks of the three hues CMY; this composite black may also be reproduced using inks of three or more types. For example, in cases where both a dark ink and a light ink can be respectively utilized for cyan and magenta, composite black can be reproduced using five types of inks, i. e., these four types of inks and a yellow ink.

The main cause of paper feed error in this printer 20 is manufacturing error of the paper feed roller 24 (FIG. 4). This manufacturing error includes error in the external diameter and error in the surface roughness. For example, if the external diameter of the paper feed roller 24 is greater than its design value, the feed error is a plus error; if this diameter is smaller than the design value, the feed error is a minus error. In the present embodiment, correction of the paper feed error caused by such manufacturing error in the paper feed roller 24 is corrected for each printer prior to shipping. Accordingly, even if the permissible error of the paper feed roller 24 is set at a somewhat large value, the paper feed error at the time of actual printing can be reduced almost to zero. Furthermore, as the tolerance regarding manufacturing error of the paper feed roller 24 is relaxed, the yield of the paper feed roller 24 is increased, so that the advantage of a reduction in the cost of the printer 20 is also obtained.

In step S3 in FIG. 6, the color patch with highest image quality is selected from the plurality of printed color patches, and the patch number of this patch is set in the EEPROM 58 (FIG. 3) of the printer 20. In the example shown in FIG. 7, a white streak has been generated in the uppermost color patch, and a black streak has been generated in the lowermost color patch. Accordingly, the patch number of the central color patch, in which there is no such deterioration in the image quality, is stored in the EPROM 58. The paper feed correction value set by inspection prior to shipping is referred to as the "reference correction value".

In step S4, a judgment is made as to whether or not steps S1 through S3 have been completed for all of the printing papers that are planned to be used in the printer 20. If the steps have not been completed, the processing returns to step S1. Here, the term "all of the printing papers that are planned to be used in the printer 20" refers to the types of printing papers that can be selected by the user in a property window of the printer driver 96 (FIG. 1). Thus, paper feed reference correction values are set for all of the different types of printing papers.

Figure 8:
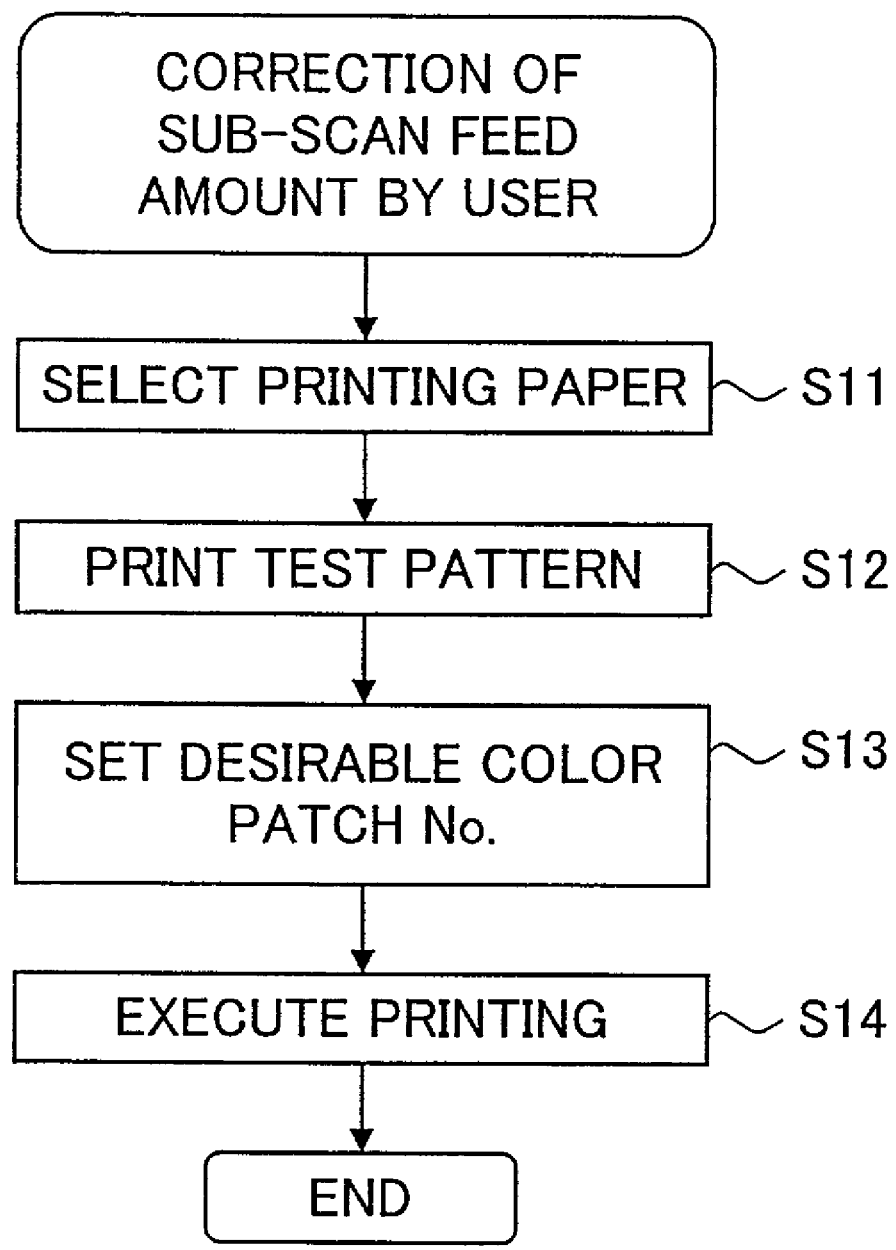
FIG. 8 is a flow chart which shows the procedure used for paper feed correction performed by a user.
Figure 9:
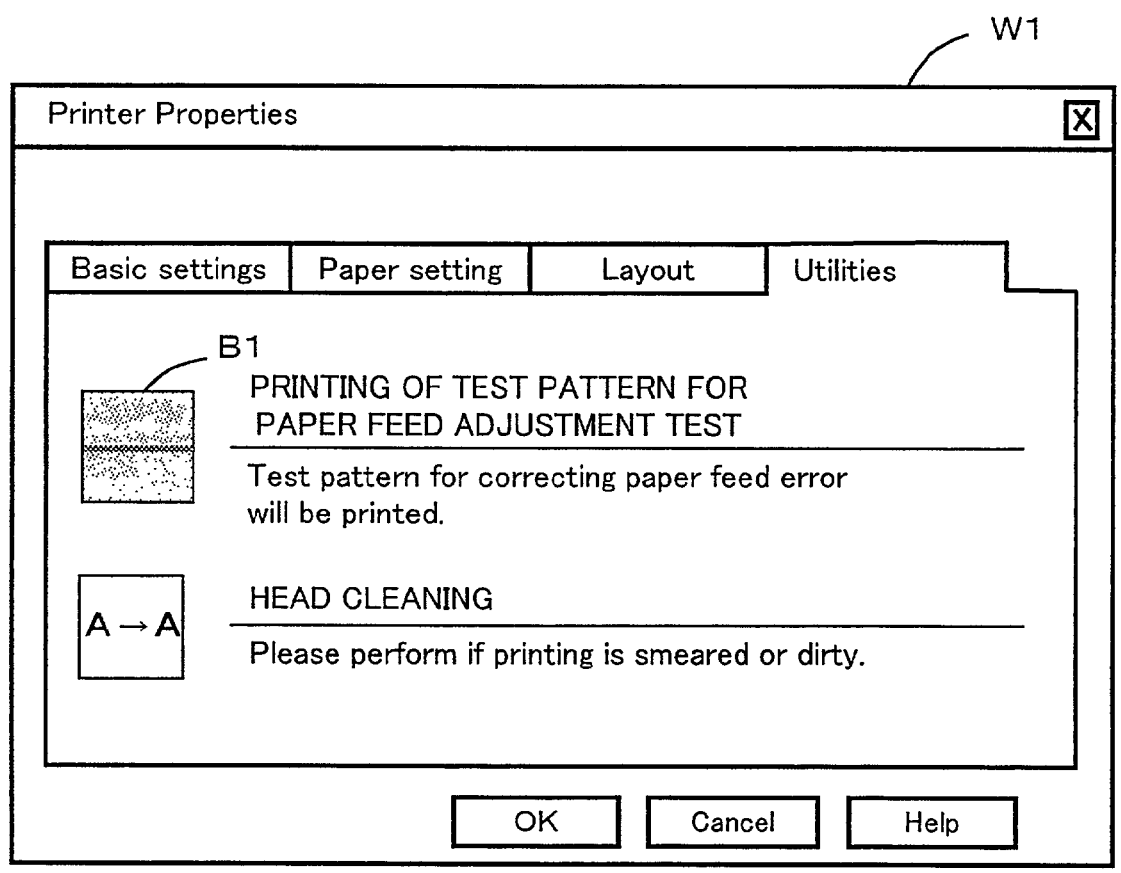
FIG. 9 is an explanatory diagram which shows an example of the user interface window W1 that allows the user to issue test pattern printing instructions.

FIG. 8 is a flow chart which shows the procedure used for paper feed correction performed by a user. In step S11, the user selects the type of printing paper, and in step S12, the user causes a test pattern to be printed by inputting a test pattern print command. FIG. 9 is an explanatory diagram which shows an example of the user interface window W1 that allows the user to issue test pattern printing instructions. This window W1 is a utility window in the printer properties; here, a button B1 which is used to input printing instructions for the paper feed adjustment test pattern is provided. When the user clicks on the button B1, the test pattern supply module 102 (FIG. 1) reads out a test pattern print signal TPS from the hard disk 92 and provides this signal to the printer 20, and the printer 20 prints a test pattern in accordance with this signal. This test pattern may be the same as the test pattern (FIG. 7) that is used for paper feed correction prior to shipping, or may be a different test pattern. In the present embodiment, the test pattern shown in FIG. 7 is also used for the paper feed correction that is performed by the user. The composition of the test pattern print signal TPS will be described later.

Figure 10:
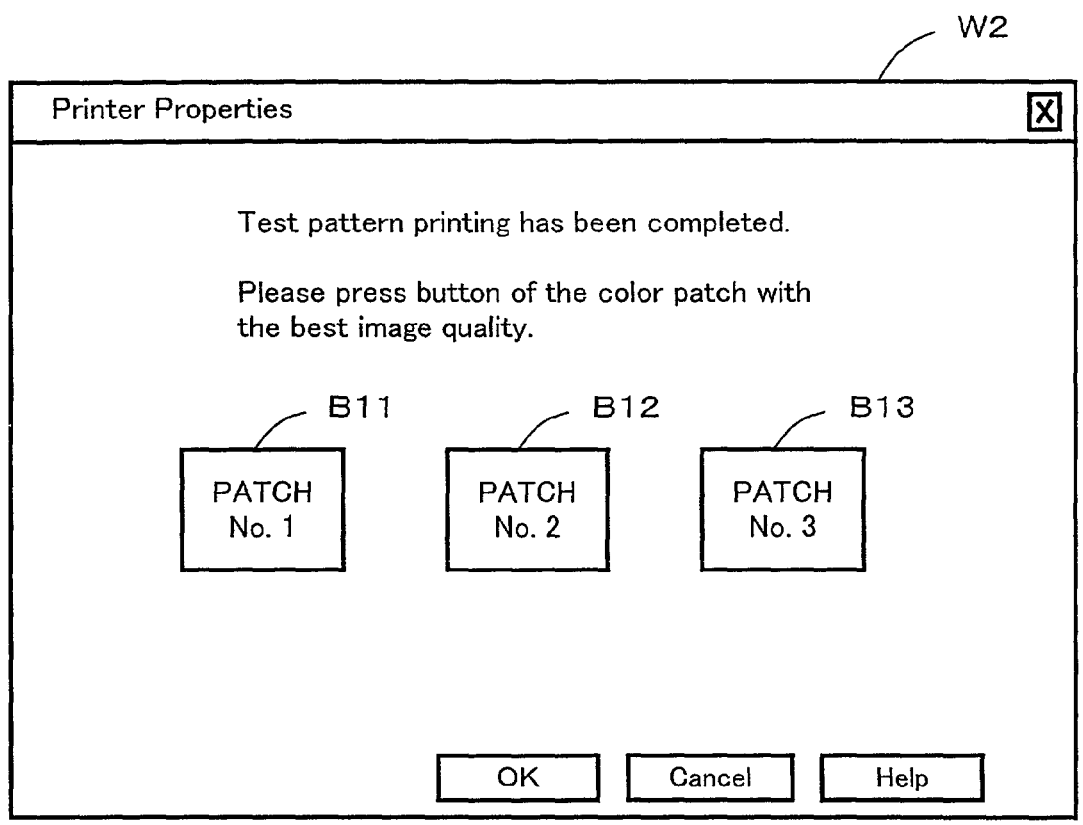
FIG. 10 is an explanatory diagram which shows an example of the user interface window W2 that allows the user to set the desired patch number.

In step S13 in FIG. 8, the color patch with the highest image quality is selected from the plurality of printed color patches, and the patch number of this color patch is set. FIG. 10 is an explanatory diagram which shows an example of the user interface window W2 that allows the user to set the desired patch number. When the test pattern is printed, this window W2 is automatically displayed by the user interface display module 101 (FIG. 1). A plurality of buttons B11 through B13 that are used to select the desired patch number are disposed in this window W2. When the user clicks on one of these buttons B11 through B13, the desired patch number is set in the EEPROM 58 (FIG. 3) of the printer 20. The patch number may be registered in the EEPROM 58 as a substitute for the reference correction value set in step S3 in FIG. 6, or may be registered in the EEPROM 58 as a value that further corrects the reference correction value. The patch number indicating the feed correction value set by the user may also be registered in the printer driver 96 rather than in the EEPROM 58.

In step S14 in FIG. 8, actual printing is performed in accordance with the instructions of the user. In this case, the operation of the paper feed motor 31 (FIG. 3) is controlled in accordance with the paper feed correction value set in step S13.

Thus, in the present embodiment, the paper feed error caused by manufacturing error in the paper feed roller 24 is corrected for each printer; accordingly, the paper feed error during actual printing can be reduced, so that printing with a high image quality can be realized. Furthermore, the tolerance of the manufacturing error of the paper feed roller 24 can be increased; as a result, the manufacturing yield of the paper feed roller 24 is increased, so that the cost of the printer 20 can be reduced. Moreover, since the user can also correct the paper feed error, compensation can be made for the paper feed error even in cases where the paper feed error varies over time as a result of wear on the gear train 40 (FIG. 4) of the paper feed mechanism or the like, so that printing with high image quality can be performed.

Figure 11:
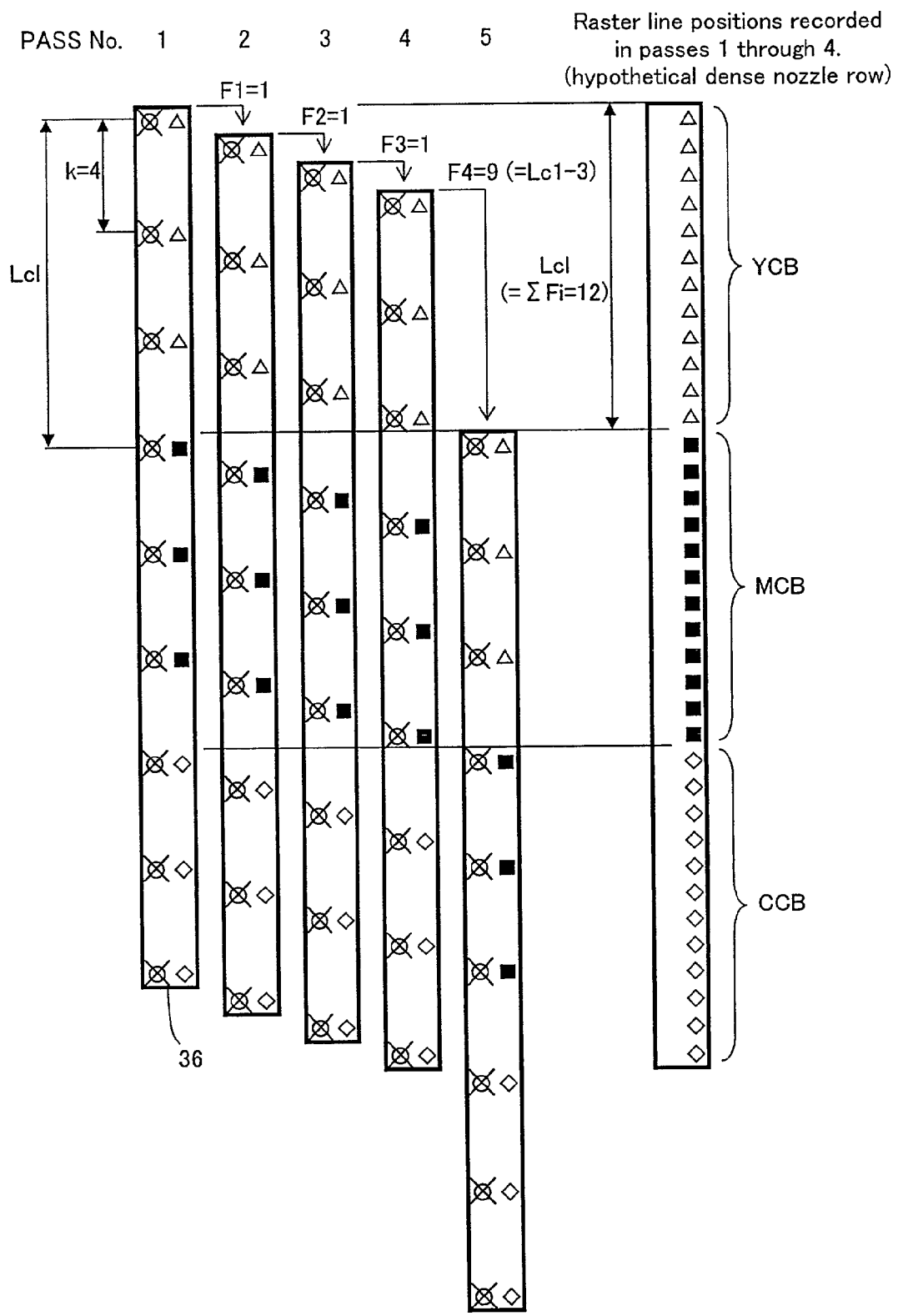
FIG. 11 shows an example of the paper feed used when the test pattern is printed.

C. Details of Test Pattern Printing Method and Method Used to Determine Paper Feed Correction Value:

FIG. 11 shows an example of the paper feed used when the test pattern is printed in step S2 in FIG. 6 and step S12 in FIG. 8. Here, the respective positions of the print head 36 in the sub-scan direction are shown in five passes, i. e., pass 1 through pass 5. Here, the term "pass" refers to a single main scan. In FIG. 11, only a reduced number of nozzles of the print head 36 are shown for convenience of illustration; the number of black nozzles (indicated by white circles) is nine, and the number of colored nozzles for each color is three. Furthermore, since the composite black gray patches shown in FIG. 7 are reproduced, the nine black nozzles are not used. In other words, three nozzles each are used for the three colors CMY.

Here, the nozzle pitch k is 4 dots, and a gap of 3 lines is formed between the raster lines (main scan lines) recorded in a single pass. The feed amounts F1, F2 and F3 following passes 1, 2 and 3 are each 1 dot. Accordingly, in passes 2 through 4, the 3 lines in the gap that were not recorded in pass 1 are recorded. The raster line positions recorded in passes 1 through 4 are shown at the right end of FIG. 11. As is seen from this figure, 12 contiguous lines are respectively recorded by the ink of each color in passes 1 through 4. Here, a band of the 12 lines recorded in yellow is called "yellow color band YCB". Similarly, a band of the 12 lines recorded in magenta is called "magenta color band MCB", and a band of the 12 lines recorded in cyan is called "cyan color band CCB". Each of the color bands is the same as the raster lines printed in a single pass using a hypothetical dense nozzle row that has 12 nozzles aligned at a nozzle pitch k of 1 dot for each ink. In other words, passes 1 through 4 are equivalent to a single pass using a dense nozzle row such as that shown at the right end of FIG. 11.

The paper feed amount F4 following pass 4 is 9 dots; as a result of this paper the nozzle at the upper end of the yellow nozzle group of the print head 36 is positioned at the uppermost end of the region in which no yellow dots are recorded. The same is true of the upper-end nozzles for the other inks. Such a recording method may be viewed as being equivalent to a recording method in which the paper is fed by the band width Lc1 of one color each time that one pass is made using the hypothetical dense nozzle row shown at the right end of FIG. 11. Accordingly, the paper feed shown in FIG. 11 is called a "quasi-band feed".

The feed amount F4 following pass 4 is equal to the value obtained by subtracting the total value (=3 dots) of the feed amounts F1 through F3 for the three preceding passes from the band width Lc1 of one color. Accordingly, the total ΣFi of the feed amounts F1 through F4 for four passes is equal to the band width Lc1 of one color. Furthermore, the band width Lc1 of one color is equal to the range of one colored nozzle row; this is also equal to the value N×k (=12) obtained by multiplying the number of nozzles N (=3) and the nozzle pitch k (=4).

In FIG. 11 the number of nozzles N per color is set at three for convenience of illustration; in actuality, however, the number of nozzles N per color is several tens of nozzles or greater. FIGS. 12(A) and 12(B) show examples of the paper feed amounts used in actual printing using the print head 36 shown in FIG. 5. This actual paper feed amount is set beforehand in the printer driver 96. FIG. 12(A) shows an example of quasi-band feed. In the color mode, the feed amounts F1 through F3 for three passes are all 1 dot, and the feed amount F4 for the fourth pass is 237 dots. The total of the feed amounts F1 through F4 for these four passes is equal to the band width of one color, i. e., N×k (=240). Furthermore, the number of nozzles N used for each color is 60. FIG. 11 shows the paper feed of this color mode in abbreviated form.

In the monochromatic mode shown in FIG. 12(A), 180 black nozzles are used. The feed amounts F1 through F3 for three passes are all 1 dot, and the feed amount F4 for the fourth pass is 717 dots. The total of the feed amounts F1 through F4 for these four passes is equal to the band width of the black nozzles, i. e., N×k (=720).

FIG. 12(B) shows an example of the paper feed amounts in printing using an ordinary interlace recording mode that does not use a quasi-band feed. Here, the term "interlace recording mode" refers to a printing method by which gaps are generated between the raster lines recorded in one pass. In other words, a printing method using a print head in which the nozzle pitch k is 2 dots or greater corresponds to an "interlace recording mode".

In the example shown in FIG. 12(B), the respective feed amounts Fi are equal to the number of nozzles N used; furthermore, the feed amounts are set at fixed integral values that are mutually prime with the nozzle pitch k. Here, "mutually prime" means that the two integers do not have a common factor other than 1. In the color mode example shown in FIG. 12(B), the number of nozzles N used is 59, and one of the 60 nozzles for each color is not used. In the monochromatic mode, the number of nozzles used is 179, and one of the 180 black nozzles is not used. In the present specification, the sub-scan in which the paper feed amounts Fi are thus fixed values is called a "fixed feed". Furthermore, the utilization of a "variable feed" in which a plurality of different values are used as the paper feed amounts Fi may also be utilized.

When a test pattern is printed utilizing a quasi-band feed such as that shown in FIGS. 11 and 12(A), banding tends to occur at the boundaries of the respective color bands as a result of paper feed error. Accordingly, this method is characterized by easy detection of the paper feed error. Here, the term "banding" refers to band-form areas of image deterioration running along the main scan direction. For example, in the case of the test pattern shown in the uppermost part of FIG. 7, light banding (a white streak) is generated at the boundary between the upper half and lower half, and in the case of the test pattern shown in the lowermost part of the same figure, dark banding (a black streak) is generated. Such a white streak is generated in cases where the paper feed is insufficient, and a black streak is generated in cases where the paper feed is excessive. The detection of banding may be accomplished using the naked eye, or may be accomplished automatically by capturing an image of the test pattern and subjecting this image to image processing.

Thus, when a test pattern (color patches) is printed by means of a quasi-band feed using a print head 36 in which the nozzle pitch k is 2 or greater, the advantage of easy detection of the paper feed error is obtained. In this sense, printing of a test pattern using the quasi-band feed shown in FIG. 12(A) is more desirable than printing in an interlace recording mode that does not use a quasi-band feed, as shown in FIG. 12(B). The quasi-band feed shown in FIG. 12(A) is the paper feed that is most frequently utilized in the actual printing of printed matter in a printer 20 which has the print head 36 shown in FIG. 5. Accordingly, the quasi-band feed shown in FIG.

12(A) is also desirable in that the test pattern can be printed using the paper feed that is most frequently used in actual printing "as is".

The test pattern print signal TPS representing the test pattern is registered in the printer driver 96 (FIG. 1), and is stored as a file for the printer driver 96 in the hard disk 92 of the computer 90. This test pattern print signal TPS has the same format as the printing data PD (raster data+paper feed amounts) that is transmitted to the printer 20 from the printer driver 96. However, it is desirable that this test pattern print signal TPS be stored in a form in which the data is compressed. When the user issues an instruction for the printing of a test pattern, this test pattern print signal TPS is called up by the test pattern supply module 102, and is transmitted to the printer 20 after being expanded if necessary. Thus, in the present embodiment, since the test pattern print signal TPS is registered in the printer driver 96 in a format that allows transmission to the printer 20 "as is", the system is advantageous in that the printing of the test pattern can be accomplished in a short time. This advantage is especially conspicuous in cases where a two dimensional test pattern such as the color patches shown in FIG. 7, is used.

Furthermore, in the present embodiment, since the test pattern print signal TPS is stored as a file in the printer driver 96, the following advantage is obtained: when the specifications of the printer driver 96 is changed, the test pattern print signal TPS can be simultaneously updated to a new version together with the printer driver 96. Accordingly, the test pattern that is used for the paper feed amount that is actually used by the printer driver 96 can be used to correct the paper feed amount.

In this printer 20, as is shown in FIGS. 12(A) and 12(B), a plurality of different paper feed amounts can be utilized. Accordingly, in the present embodiment, the correction value $\delta$ is determined for respective paper feed amounts.

Figure 13A:
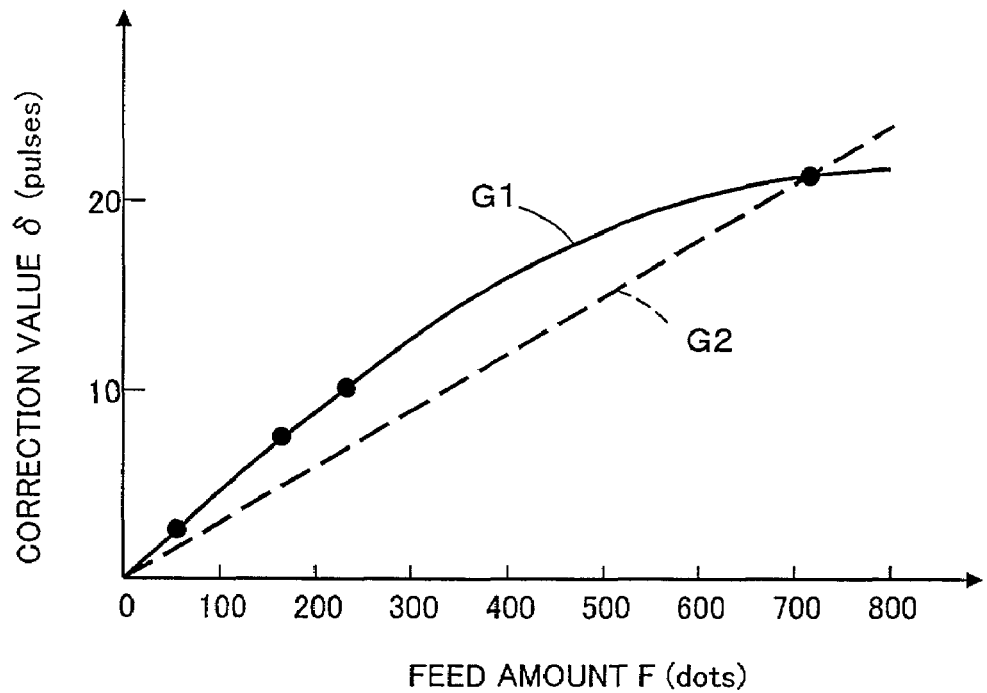
FIGS. 13(A) and 13(B) are explanatory diagrams which show the relationship between a paper feed amount F and a correction value δ.
Figure 13B:
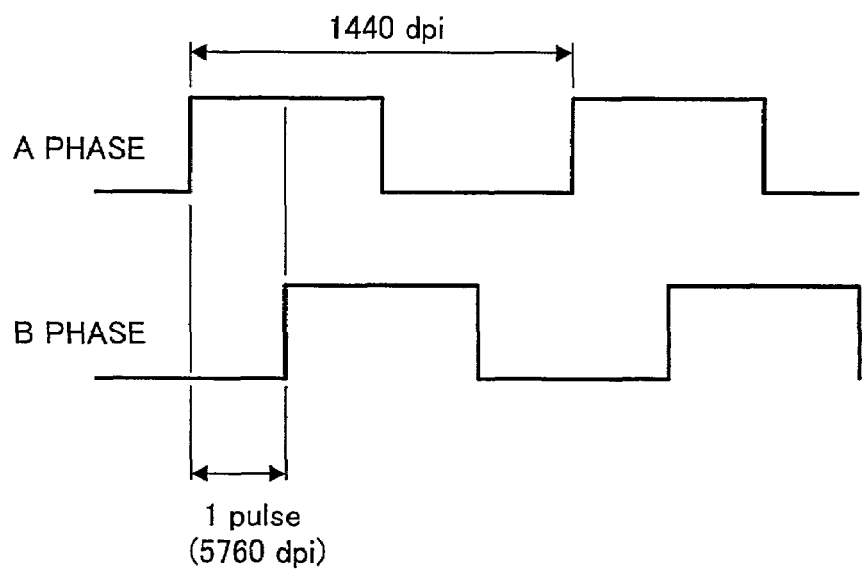

FIG. 13(A) shows the relationship between the paper feed amount F and the correction value $\delta$. Here, the units of the paper feed amount F are "dots", and the units of the correction value $\delta$ are "pulses". FIG. 13(B) shows the units of the correction value $\delta$. Here, it is assumed that one period of the signals of the A phase and B phase of the rotary encoder 46 (FIG. 4) of the paper feed mechanism corresponds to 1440 dpi. In an ordinary encoder, the signals of the A phase and B phase are phase-shifted by a ¼ period; accordingly, the position can be designated in units of ¼ of the period of 1440 dpi. Thus, in the present embodiment, a distance corresponding to ¼ of the period (1440 dpi) of the signals of the A phase and B phase of the encoder 46 is used as the unit "pulse" of the correction value $\delta$.

However, some other value may be used for the units of the correction value $\delta$. For example, ½ of the period of the output signals of the encoder may also be used as the units of the correction value $\delta$. In cases where a step motor is used as the paper feed motor 31, one step pulse can be used as the units of the correction value $\delta$.

The black circles in FIG. 13(A) show the correction values $\delta$ for the four feed amounts F: 59 dots, 179 dots, 237 dots and 717 dots. These four feed amounts F are those used in the four examples shown in FIGS. 11(A) and 11(B). Since the correction value for a 1 dot feed is almost zero, this corrections value is omitted in FIG. 13(A).

The various methods described below may be utilized as the method for determining the relationship between the plurality of feed amounts F and the correction values $\delta$ for these feed amounts.

Method 1: test patterns are actually printed using the plurality of feed amounts, and the correction value $\delta$ for each feed amount is determined.

Method 2: a test pattern is printed using a representative feed amount among the plurality of feed amounts to determine a correction value $\delta$ for this feed amount, and the correction values for the other feed amounts are predicted on the basis of this correction value.

In cases where Method 1 is used, for example, respective test patterns may be printed in the four types of modes shown in FIGS. 12(A) and 12(B), after which the respective correction values $\delta$ (in concrete terms, patch numbers) are determined.

In Method 2, there may be cases in which only a single value is used as the representative feed amount, and cases in which two or more values are used as representative feed amounts. In cases where only a single feed amount F is used as the representative feed amount, for example, a test pattern is printed for only the maximum value (=717) among the feed amounts F shown in FIGS. 12(A), 12(B) and 13(A), and the correction value $\delta$ for this feed amount is determined; then, the correction values for the other three feed amounts are predicted from this correction value. For example, the prediction of correction values for feed amounts other than the representative feed amount can be accomplished by setting the shape of a characteristic curve (predictive curve) such as the curve G1 or straight line G2 passing through the origin as shown in FIG. 13(A). Generally, it is sufficient to predict the correction values for feed amounts other than the representative feed amount in accordance with a predetermined predictive curve. Here, the term "predictive curve" has a broad sense that includes straight lines.

The reason why it is desirable to use the maximum value of the feed amounts used in the printer as the representative feed amount is that the correction value increases with the magnitude of the feed amount. In cases where two or more values are used as representative feed amounts, for example, the maximum value of the feed amounts used in the printer and one other arbitrary feed amount are used.

Thus, if a correction value is determined only for the representative feed amount by printing a test pattern, and the correction values for the other feed amounts are predicted from the correction value for this representative feed amount, the number of test patterns required is reduced, so that the time required for correction can be shortened.

FIG. 14 is a table which shows paper feed correction values determined for different types of printing paper. In this table, correction values $\delta$ for four feed amounts F are registered for each of four types of printing paper. As is seen from this example, the ease of slipping varies according to the type of printing paper; accordingly, it is desirable to register respective correction values $\delta$ for each type of printing paper. If this is done, an appropriate paper feed correction can be performed for each type of printing paper.

Actual measurement of the correction values $\delta$ for each type of printing paper is not always necessary. For example, a method may be used in which correction values are actually measured for only one specified type of printing paper among the plurality of different types of printing paper, and the correction values for the other types of printing paper are predicted from these correction values. In concrete terms, for example, a method can be used in which the correction values $\delta$ for ordinary paper are measured, and the correction values for other types of printing paper are determined by multiplying the correction values for ordinary paper by respective specified coefficients. Ordinarily, an approximately fixed relationship holds between correction values for different types of printing paper, and there is seldom any great departure from this relationship; accordingly, such predictions are possible. If this is done, then determination of the correction values for a single type of printing paper makes it possible to perform an appropriate paper feed correction for other types of printing paper as well. Furthermore, such a method is especially advantageous in that the effort expended by the user in printing a test pattern for the printer 20 is reduced, so that the trouble of paper feed corrections can be alleviated.

Figure 15:
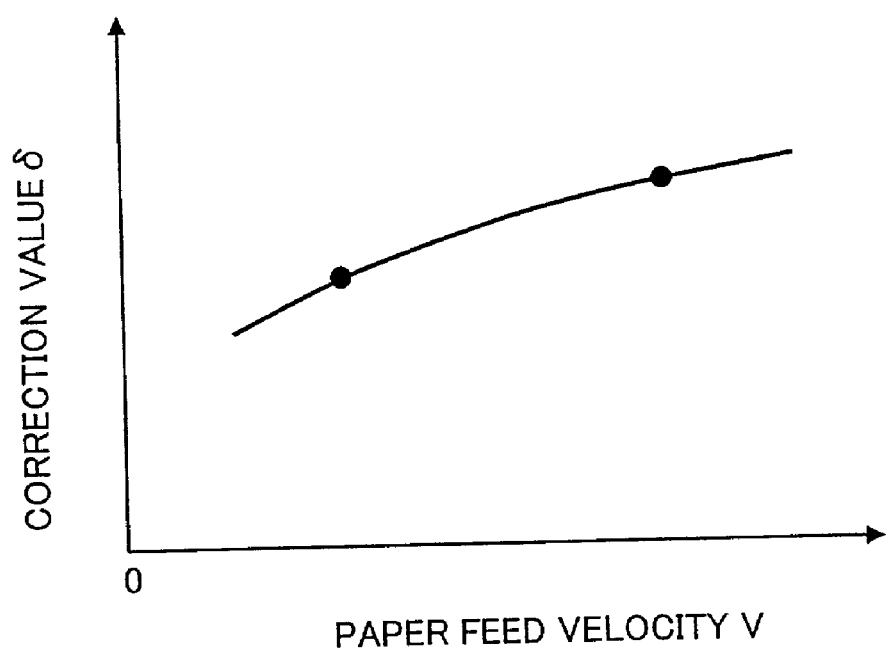
FIG. 15 is a graph which shows the relationship between a paper feed velocity V and the correction value δ.

FIG. 15 is a graph which shows the relationship between the paper feed velocity V and the correction value δ. As is shown here, the correction value for the paper feed amount tends to increase with an increase in the paper feed velocity V. Accordingly, in cases where the paper feed velocity varies according to the printing mode, it is desirable to set the paper feed correction value δ in accordance with the paper feed velocity. In this case as well, it is possible to use a method in which the correction value is actually measured for one paper feed velocity, and the correction values for other paper feed velocities are predicted from this correction value.

The correction values δ shown in FIGS. 13(A), 13(B), 14, and 15 are registered in a nonvolatile memory (EEPROM 58) inside the printer, and in the printer driver 96 (concretely, in the hard disk of the computer 90). Then, at the time of actual printing, the value obtained by correcting the paper feed amount F by the corresponding correction value δ is provided to the sub-scan drive circuit 62 by the system controller 54 as a command value.

FIGS. 16(A) and 16(B) show two transmission methods for the paper feed amount F and corresponding correction value δ. In the first method shown in FIG. 16(A), the uncorrected normal feed amount F is transmitted to the system controller 54 from the printer driver 96. The paper feed controller 54a of the system controller 54 reads out the correction value δ from the EEPROM 58, corrects the feed amount F, and provides the corrected feed amount to the sub-scan drive circuit 62 as a command value. In the second method shown in FIG. 16(B), a corrected feed amount F' is transmitted to the system controller 54 from the print driver 96. The paper feed controller 54a of the system controller 54 provides the corrected feed amount F' to the sub-scan drive circuit 62 as a command value.

Thus, in the present embodiment, a test pattern is printed using the same interlace recording mode as that used in actual printing, and the paper feed amount is corrected using a correction value δ that is determined in accordance with the results of this test pattern. Accordingly, printing with a high image quality in which there is little paper feed error can be performed. In particular, since correction values are registered for each type of printing paper, compensation can be made for differences in the paper feed amount arising from the printing paper that is actually used.

Figure 17:
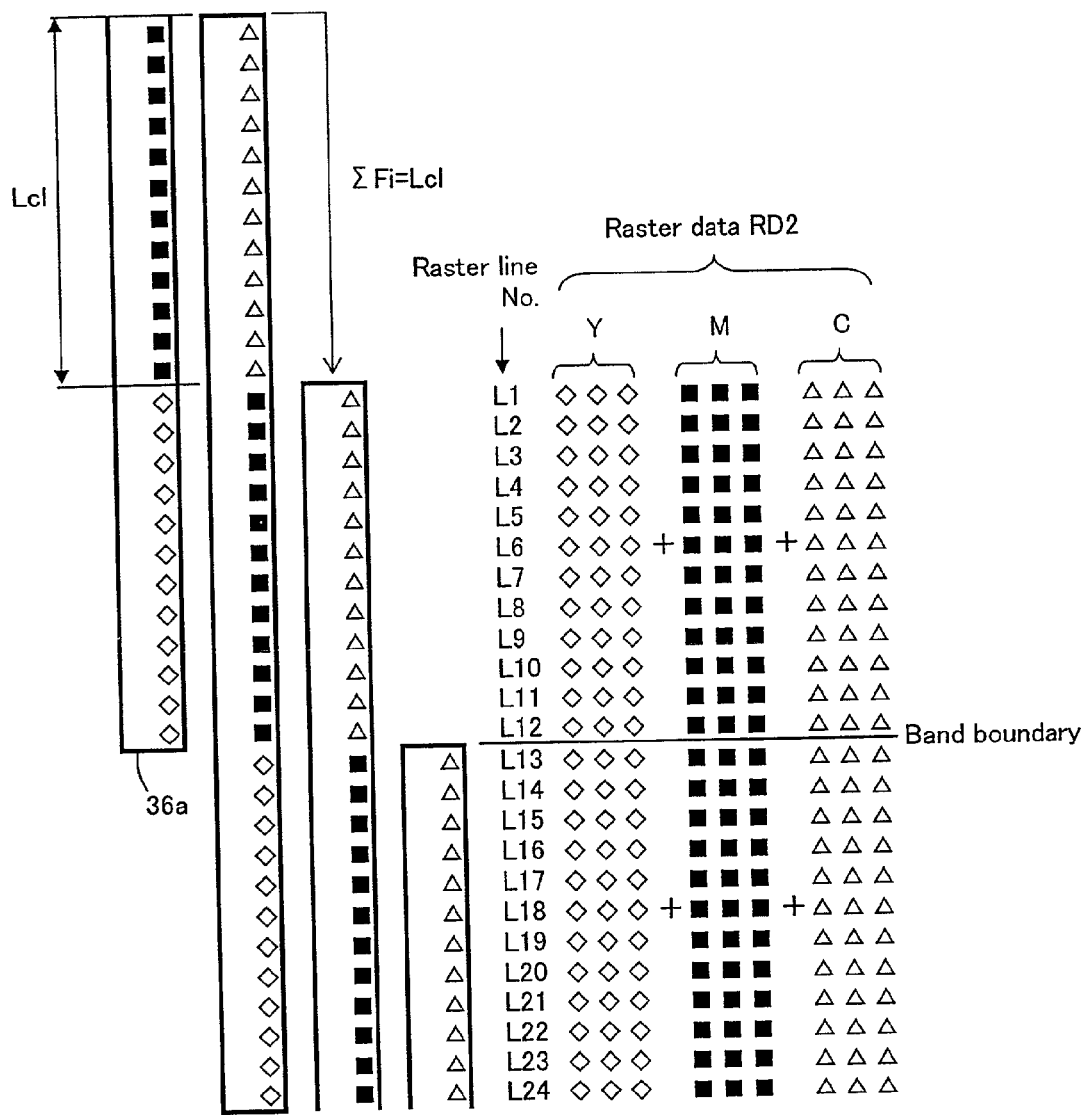
FIG. 17 is an explanatory diagram which shows the content of the test pattern print control signal used for patch No. 2.

D. Structure of Test Pattern Print Signal:

FIG. 17 shows one example of the test pattern print signal that is used to realize the patch of patch No. 2 shown in FIG. 7. The hypothetical dense nozzle row 36a shown in FIG. 11 is shown in FIG. 17. As was shown in FIG. 11, this dense nozzle row 36a is constructed by four passes. The dense nozzle row 36a may be viewed as an entity that is fed in the sub-scan direction by the band width Lc1 of one color at a time.

The structure of raster data RD1 that is used to form one color patch with 24 raster lines L1 through L24 using such a dense nozzle row 36a is shown in the right half of FIG. 17. On the basis of this raster data RD1, dots of the three colors Y, M and C are respectively recorded on all of the raster lines L1 through L24. Furthermore, in FIG. 18, the positions where the Y, M and C dots are formed are shifted for convenience of illustration; in actuality, however, dots of the respective colors are formed in the same pixel positions.

When such a test pattern print signal is used, a patch with no banding, such as patch No. 2 shown in FIG. 7, is formed in cases where the paper feed error is zero. On the other hand, when the paper feed error is a plus error, a white streak is formed at the band boundary, and when the paper feed error is a minus error, a black streak is formed at the band boundary. In other words, in the case of the print signals shown in FIG. 17, the paper feed error is simulated by differences in the paper feed amounts of the respective patches.

Figure 18:
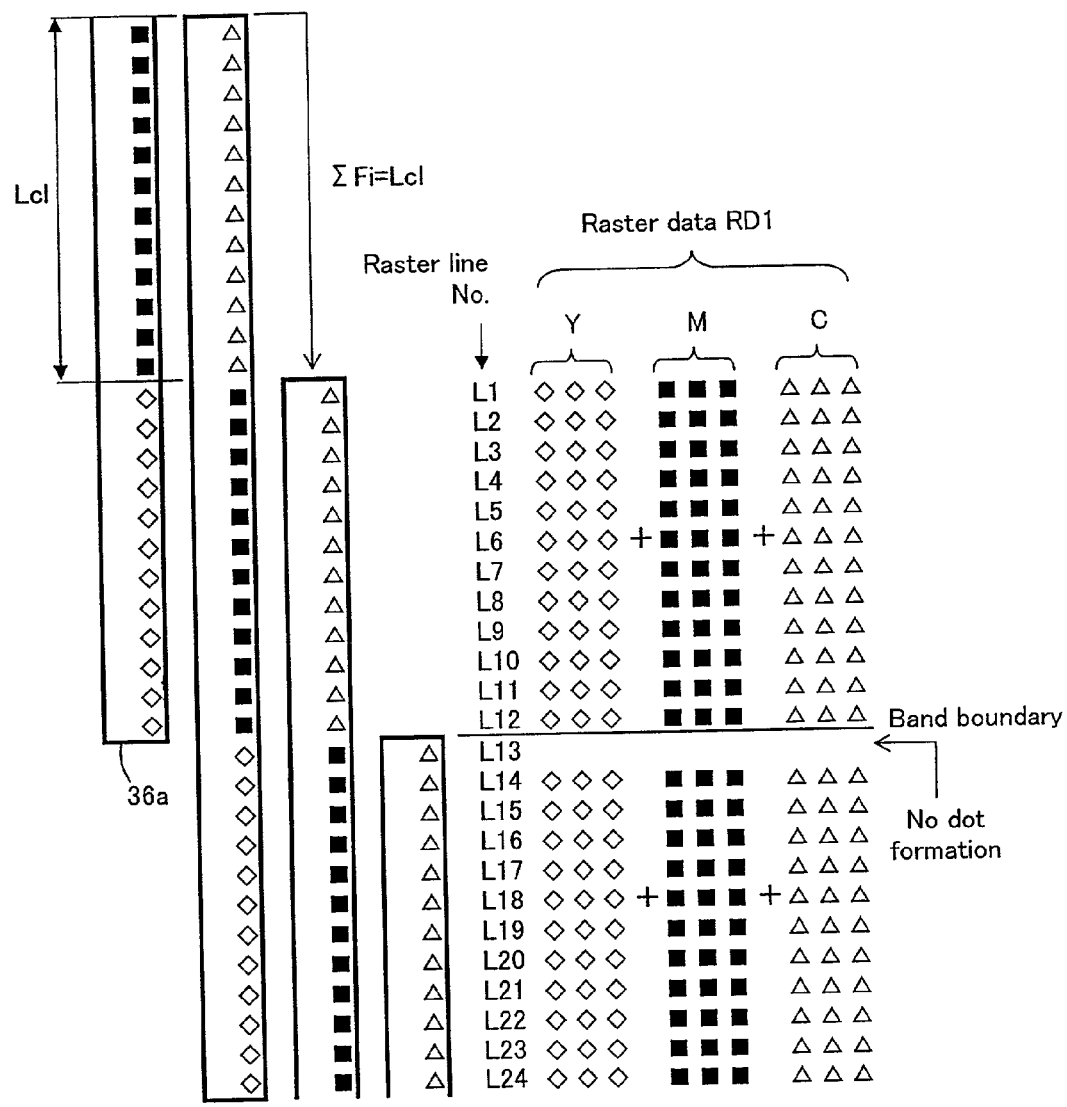
FIG. 18 is an explanatory diagram which shows the content of the test pattern print control signal used for patch No. 1.

FIG. 18 shows one example of the test pattern print signal that is used to reproduce patch No. 1 shown in FIG. 7. In the case of this print signal, the paper feed amount is the same as that shown in FIG. 17; however, the raster data that expresses the conditions for dot formation in the respective pixels is different from that shown in FIG. 17. Specifically, on the raster line L13 immediately below the band boundary, raster data is formed so that no dots of any of the Y, M or C inks are formed. In other words, in the print signal shown in FIG. 18, the paper feed error is simulated by differences in the raster data of the respective patches. If such a test pattern print signal is used, then a patch with a white streak, such as the patch of patch No. 1 shown in FIG. 7, is printed in cases where the paper feed error is zero. Accordingly, if a paper feed error of 1 dot is present during actual printing, a clean patch with no white streak is reproduced.

FIGS. 19(A) and 19(B) are explanatory diagrams which shows examples of structure of test pattern print signals. The print signals used for the respective patches include the paper feed amounts and raster data. In the first example shown in FIG. 19(A), the print signals used for the respective patches have the same paper feed amounts, while the raster data is different in the respective signals. Furthermore, a value in the color mode of example 1 of the paper feed in FIG. 12 is used as the paper feed amount. The print signals shown in FIGS. 17 and 18 correspond to the print signals in FIG. 19(A).

In the case of the second example shown in FIG. 19(B), the print signals used for the respective patches have the same raster data and different paper feed amounts. Specifically, the data inherently free of banding shown in FIG. 17 is used as the raster data. Furthermore, in regard to the paper feed amount, the value of the fourth feed amount F4 successively differs by 1 dot in the print signals used for the respective patches.

Both sets of the print signals shown in FIGS. 19(A) and 19(B) can print the three patches shown in FIG. 7. However, in cases where the respective patches are printed using the same paper feed amounts and using raster data that simulates the sub-scan feed error as shown in FIG. 19(A), the units of the paper feed amount correction values are limited to integral multiples of the raster line pitch. On the other hand, in cases where the respective patches are printed using the same raster data and paper feed amounts that simulates the sub-scan feed error as shown in FIG. 19(B), the units of the paper feed amount correction value can be set finer than the raster line pitch, as was also indicated in FIG. 13(B).

E. Modifications:

E1. Modification 1:

The above embodiments are directed with reference to color ink jet printers, but the present invention can also be applied to monochromatic printers. Furthermore, the present invention can also be applied to printers other than ink jet printers. Generally, the present invention can be applied to printing devices that record images on printing media; for example, the present invention can be applied to facsimile devices and copying machines.

E2. Modification 2:

The above embodiments are described in cases where the nozzle pitch k is 4 dots. In general, however, the present invention can be used in cases where printing is performed in an interlace recording mode using a print head in which the nozzle pitch k is 2 dots or greater. Generally, quasi-band feeding is accomplished by performing one sub-scan with a feed amount of {N×k−(k−1)} dots after a sub-scan with a 1 dot feed is performed (k−1) times. In this case, dot recording is performed during the main scan between the respective sub-scan feeds. Furthermore, the unit of "1 dot" refers to the dot pitch in the sub-scan direction.

E3. Modification 3:

The above embodiments use, as shown in FIG. 5, a print head 36 with a two-row structure consisting of a black nozzle row and a color nozzle row. However, the present invention can also be applied to print heads in which the nozzle rows for the respective colors are all in the same position in the sub-scan direction, and are successively aligned along the main scan direction.

E4. Modification 4:

In the above embodiments, color patches are used as a test pattern; however, arbitrary patterns other than color patches can also be used as test patterns. However, if color patches are used, the advantage of easy detection of banding caused by the paper feed error is obtained.

Furthermore, in the above embodiments, correction values are determined using one type of test pattern; however, it would also be possible to determine correction values using a plurality of different types of test patterns. For example, it would also be possible to use a method in which a rough correction value is determined using a first test pattern used for rough adjustment, and a final fine correction value is then determined using a second test pattern used for fine adjustment. For example, the rough correction value can be set at 10-step intervals, and the fine correction value can be set at 1-step intervals. If a plurality of stages of adjustment are thus performed, a fine correction value can be efficiently determined.

E5. Modification 5:

In the above embodiments, gray patches reproduced by composite black are used as the color patches of the test pattern. However, other color patches can also be used. For example, gray patches reproduced by black ink alone, or monochromatic color patches reproduced by cyan ink or magenta ink can also be used. Alternatively, color patches of secondary colors reproduced using two inks among inks of the three colors cyan, magenta and yellow can also be used. The inks selected for reproducing the color patches are inks for which an improvement of the image quality by correction of the paper feed error is desired. Specifically, if the color patches are reproduced using inks for which an improvement of the image quality by correction of the paper feed error is desired, then the quality of images in which this inks are widely used can be achieved by correcting the paper feed error using these color patches.

E6. Modification 6:

In the above embodiments, the correction values are determined by visual observation of the test pattern by a human being. However, instead of this, it would also be possible to use a method in which the effects of sub-scan feed error on the image quality are measured using an image quality measuring device that automatically measures the image quality of the test pattern, and the sub-scan feed may be corrected by a correction device in accordance with the measurement results. If this is done, then the sub-scan feed error can be appropriately corrected without any need for manual operation.

E7. Modification 7:

Although the above embodiments are described with reference to interlace recording mode printing, the present invention is also applicable to non-interlace recording mode printing. The term "non-interlace recording mode" refers to a printing method that is performed using a print head that has nozzles aligned in a row at a nozzle pitch that is equal to the dot pitch in the sub-scan direction (i.e., the main scan line pitch).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of correcting a sub-scan feed amount of a printing medium in a printing device which performs printing by recording ink dots on the printing medium while moving a print head in a main scan direction, comprising the steps of:
   (a) setting plural feed amounts of sub-scan of a printing medium that are to be used in actual printing;
   (b) printing a test pattern including a plurality of color patches printed with different correction values, respectively, for at least one representative feed amount among the plural feed amounts, the test pattern being used to determine a correction value for the representative feed amount;
   (c) using the correction value for the representative feed amount determined from a print of the test pattern in order to predict correction values for the other feed amounts; and
   (d) correcting sub-scan feed amounts during printing on the basis of the correction value for the representative feed amount and the predicted correction values for the other feed amounts;
   wherein the correction value for the other feed amounts are predicted from the correction value for the representative feed amount in accordance with a predetermined, non-linear, predictive curve; and
   wherein the representative feed amount includes a maximum value among the plural feed amounts, and the other feed amounts of the plural feed amounts for which the correction values are predicted are different from the representative feed amount.

2. A correction method according to claim 1, wherein
   the print head includes a plurality of nozzles arranged at a nozzle pitch of k times (k is an integer of 2 or greater) a dot pitch in a sub-scan direction that is substantially perpendicular to the main scan direction,
   the plural feed amounts are used in printing in an interlace recording mode, and
   the printing of the test pattern in the step (b) is performed in the interlace recording mode.

3. A correction method according to claim 1, wherein the step (c) includes a step of storing the correction values for the plural feed amounts in a non-volatile memory in the printing device.

4. A correction method according to claim 1, wherein the step (c) includes a step of determining the correction values for the plural feed amounts with respect to each of a plurality of printing media that are planned to be used in the printing device.

5. A correction method according to claim 4, wherein the step (c) further includes steps of:
   determining correction values for the plural feed amounts using the test pattern with respect to a selected one of a plurality of printing media; and
   predicting correction values for the plural feed amounts with respect to the other printing media from the correction values for the plural feed amounts respect to the selected one of a plurality of printing media.

6. A correction method according to claim 1, wherein the step (c) includes a step of determining the correction values with respect to each of sub-scan velocities that are planned to be used in the printing device.

7. A method of correcting a sub-scan feed amount of a printing medium in a printing device which performs printing by recording ink dots on the printing medium while moving a print head in a main scan direction, comprising the steps of:
   (a) setting plural feed amounts of sub-scan of a printing medium that are to be used in actual printing;
   (b) printing a test pattern including a plurality of color patches printed with different correction values, respectively, for at least one representative feed amount among the plural feed amounts, the test pattern being used to determine a correction value for the representative feed amount;
   (c) using the correction value for the representative feed amount determined from a print of the test pattern in order to predict correction values for the other feed amounts; and
   (d) correcting sub-scan feed amounts during printing on the basis of the correction value for the representative feed amount and the predicted correction values for the other feed amounts;
   wherein the step (b) includes the steps of:
      (i) selecting N nozzles-to-be-used (N is an integer of 2 or greater) among a plurality of nozzles for each color;
      (ii) performing (k−1) scan sets each consisting of one main scan and one sub-scan feed by a first feed amount that is equal to a dot pitch in a sub-scan direction, and performing one main scan and a sub-scan feed by a second feed amount that is equal to $\{N \times k - (k-1)\}$ times the dot pitch, wherein k is an integer of 2 or greater; and
      (iii) repeatedly performing step (ii) to print the test pattern.

8. A printing device for performing printing by recording ink dots on a printing medium while moving a print head in a main scan direction, comprising:
   a print head including a plurality of nozzles;
   a main scan drive section which causes the print head to move in the main scan direction;
   a sub-scan drive section which causes a printing medium to move in a sub-scan direction by intermittent feeding a plurality of times;
   a head drive section which causes the plurality of nozzles to eject ink droplets during the main scan of the print head; and
   a controller which controls the main scan drive section, sub-scan drive section and head drive section,
   wherein the controller has a test pattern print mode for printing a test pattern including a plurality of color patches printed with different correction values, respectively, for at least one representative feed amount among plural feed amounts that are to be used in actual printing, the test pattern being used to determine a correction value for the representative feed amount,
   the controller uses the correction value for the representative feed amount determined from a print of the test pattern in order to predict correction values for the other feed amounts, and
   the controller corrects sub-scan feed amounts during printing on the basis of the correction value for the representative feed amount and the predicted correction values for the other feed amounts, and supplies instructions expressing the corrected sub-scan feed amounts to the sub-scan drive section; and
   wherein the correction value for the other feed amounts are predicted from the correction value for the representative feed amount in accordance with a predetermined, non-linear, predictive curve; and
   wherein the representative feed amount includes a maximum value among the plural feed amounts, and the other feed amounts of the plural feed amounts for which the correction values are predicted are different from the representative feed amount.

9. A printing device according to claim 8, wherein
   the print head includes a plurality of nozzles arranged at a nozzle pitch of k times (k is an integer of 2 or greater) a dot pitch in a sub-scan direction that is substantially perpendicular to the main scan direction,
   the plural feed amounts are used in printing in an interlace recording mode, and
   the printing of the test pattern is performed in the interlace recording mode.

10. A printing device according to claim 8, further comprising a non-volatile memory for storing the correction values for the plural feed amounts.

11. A printing device according to claim 8, wherein the controller determines the correction values for the plural feed amounts with respect to each of a plurality of printing media that are planned to be used in the printing device.

12. A printing device according to claim 11, wherein the controller determines correction values for the plural feed amounts using the test pattern with respect to a selected one of a plurality of printing media, and predicts correction values for the plural feed amounts with respect to the other printing media from the correction values for the plural feed amounts respect to the selected one of a plurality of printing media.

13. A printing device according to claim 8, wherein the controller determines the correction values with respect to each of sub-scan velocities that are planned to be used in the printing device.

14. A printing device for performing printing by recording ink dots on a printing medium while moving a print head in a main scan direction, comprising:
   a print head including a plurality of nozzles;
   a main scan drive section which causes the print head to move in the main scan direction;
   a sub-scan drive section which causes a printing medium to move in a sub-scan direction by intermittent feeding a plurality of times;
   a head drive section which causes the plurality of nozzles to eject ink droplets during the main scan of the print head; and
   a controller which controls the main scan drive section, sub-scan drive section and head drive section,
   wherein the controller has a test pattern print mode for printing a test pattern including a plurality of color patches printed with different correction values, respectively, for at least one representative feed amount among plural feed amounts that are to be used in actual printing, the test pattern being used to determine a correction value for the representative feed amount, the controller uses the correction value for the representative feed amount determined from a print of the test pattern in order to predict correction values for the other feed amounts, and the controller corrects sub-scan feed amounts during printing on the basis of the correction value for the representative feed amount and the predicted correction values for the other feed amounts, and supplies instructions expressing the corrected sub-scan feed amounts to the sub-scan drive section;

wherein the controller performs:
(i) selecting N nozzles-to-be-used (N is an integer of 2 or greater) among a plurality of nozzles for each color;
(ii) carrying out printing process by performing (k−1) scan sets each consisting of one main scan and one sub-scan feed by a first feed amount that is equal to a dot pitch in a sub-scan direction, and by performing one main scan and a sub-scan feed by a second feed amount that is equal to {N×k−(k−1)} times the dot pitch, wherein k is an integer of 2 or greater; and
(iii) repeatedly carrying out the printing process to print the test pattern.

15. A computer program product for causing a computer to correct a sub-scan feed amount of a printing medium, the computer including a printing device which performs printing by recording ink dots on the printing medium while moving a print head in a main scan direction, the computer program product comprising:

a computer readable medium; and a computer program stored on the computer readable medium, the computer program comprising:

a first program for causing a computer to set plural feed amounts of sub-scan of a printing medium that are to be used in actual printing;

a second program for causing the computer to print a test pattern including a plurality of color patches printed with different correction values, respectively, for at least one representative feed amount among the plural feed amounts, the test pattern being used to determine a correction value for the representative feed amount;

a third program for causing the computer to use the correction value for the representative feed amount determined from a print of the test pattern in order to predict correction values for the other feed amounts; and a fourth program for causing the computer to correct sub-scan feed amounts during printing on the basis of the correction value for the representative feed amount and the predicted correction values for the other feed amounts;

wherein the correction value for the other feed amounts are predicted from the correction value for the representative feed amount in accordance with a predetermined, non-linear, predictive curve; and wherein the representative feed amount includes a maximum value among the plural feed amounts, and the other feed amounts of the plural feed amounts for which the correction values are predicted are different from the representative feed amount.

16. A computer program product according to claim 15, wherein the print head includes a plurality of nozzles arranged at a nozzle pitch of k times (k is an integer of 2 or greater) a dot pitch in a sub-scan direction that is substantially perpendicular to the main scan direction, the plural feed amounts are used in printing in an interlace recording mode, and the second program performs the printing of the test pattern in the interlace recording mode.

17. A computer program product according to claim 15, wherein the third program stores the correction values for the plural feed amounts in a non-volatile memory in the printing device.

18. A computer program product according to claim 15, wherein the third program determines the correction values for the plural feed amounts with respect to each of a plurality of printing media that are planned to be used in the printing device.

19. A computer program product according to claim 18, wherein the third program determines correction values for the plural feed amounts using the test pattern with respect to a selected one of a plurality of printing media, and predicts correction values for the plural feed amounts with respect to the other printing media from the correction values for the plural feed amounts respect to the selected one of a plurality of printing media.

20. A computer program product according to claim 15, wherein the third program determines the correction values with respect to each of sub-scan velocities that are planned to be used in the printing device.

21. A computer program product for causing a computer to correct a sub-scan feed amount of a printing medium, the computer including a printing device which performs printing by recording ink dots on the printing medium while moving a print head in a main scan direction, the computer program product comprising:

a computer readable medium; and a computer program stored on the computer readable medium, the computer program comprising:

a first program for causing a computer to set plural feed amounts of sub-scan of a printing medium that are to be used in actual printing;

a second program for causing the computer to print a test pattern including a plurality of color patches printed with different correction values, respectively, for at least one representative feed amount among the plural feed amounts, the test pattern being used to determine a correction value for the representative feed amount;

a third program for causing the computer to use the correction value for the representative feed amount determined from a print of the test pattern in order to predict correction values for the other feed amounts; and a fourth program for causing the computer to correct sub-scan feed amounts during printing on the basis of the correction value for the representative feed amount and the predicted correction values for the other feed amounts;

wherein the second program performs:
(i) selecting N nozzles-to-be-used (N is an integer of 2 or greater) among a plurality of nozzles for each color;
(ii) carrying out printing process by performing (k−1) scan sets each consisting of one main scan and one sub-scan feed by a first feed amount that is equal to a dot pitch in a sub-scan direction, and by performing one main scan and a sub-scan feed by a second feed amount that is equal to {N×k−(k−1)} times the dot pitch, wherein k is an integer of 2 or greater; and
(iii) repeatedly carrying out the printing process to print the test pattern.

* * * * *